United States Patent
Sugaya et al.

(10) Patent No.: US 10,740,428 B2
(45) Date of Patent: Aug. 11, 2020

(54) OPERATION PROCESSING DEVICE, METHOD FOR CONTROLLING INFORMATION DEVICE, AND COMPUTER-READABLE STORAGE MEDIUM FOR COMPUTER PROGRAM

(71) Applicant: Konica Minolta, Inc., Tokyo (JP)

(72) Inventors: Takashi Sugaya, Aichi (JP); Jun Kunioka, Aichi (JP); Hiroshi Iwamoto, Aichi (JP); Takeshi Hibino, Aichi (JP); Yukina Hisada, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 222 days.

(21) Appl. No.: 14/601,853

(22) Filed: Jan. 21, 2015

(65) Prior Publication Data
US 2015/0220654 A1 Aug. 6, 2015

(30) Foreign Application Priority Data
Feb. 6, 2014 (JP) ................................. 2014-020929

(51) Int. Cl.
G06F 17/20 (2006.01)
G06F 16/958 (2019.01)

(52) U.S. Cl.
CPC .................................. *G06F 16/972* (2019.01)

(58) Field of Classification Search
None
See application file for complete search history.

(56) References Cited

U.S. PATENT DOCUMENTS 6,934,932 B2 * 8/2005 Dathathraya .......... G06Q 10/10
715/273
8,004,723 B2 * 8/2011 Kawabata ............... G06F 9/451
358/403

(Continued)

FOREIGN PATENT DOCUMENTS

CN 102244705 A 11/2011
JP 2005316634 A 11/2005

(Continued)

OTHER PUBLICATIONS

Bennedich, What happens to an HTML5 web worker thread when the tab is closed while its running? Available at https://stackoverflow.com/questions/8875310/what-happens-to-an-html5-web-worker-thread-when-the-tab-is-closed-while-its-run (last accessed Nov. 4, 2018) (Year: 2012).*

(Continued)

*Primary Examiner* — Shahid K Khan
(74) *Attorney, Agent, or Firm* — Osha Liang LLP

(57) ABSTRACT

An operation processing device used to operate an information device is provided. The operation processing device includes a script execution portion configured to execute a script used for the operation processing device to cause the information device to perform a process in a state where a web page including the script is displayed; a display processing portion configured to finish, in response to operation for giving a command to finish display of the web page performed during execution of the script, the display of the web page in accordance with the operation; and a script continued execution portion configured to take over, when the display processing portion finishes the display of the web page, the script from the script execution portion to execute the script.

15 Claims, 22 Drawing Sheets

(56) References Cited

U.S. PATENT DOCUMENTS

| | | | | |
|---|---|---|---|---|
| 8,214,430 B2* | 7/2012 | Murakami | ............... | G06F 3/121 709/204 |
| 8,856,366 B2* | 10/2014 | Park | ............... | G06F 1/3203 709/229 |
| 8,982,388 B2* | 3/2015 | Mori | ............... | H04N 1/00244 358/1.14 |
| 9,036,176 B2* | 5/2015 | Iwamoto | ............... | G06K 15/4005 358/1.14 |
| 9,460,061 B2* | 10/2016 | Kimura | ............... | G06F 3/1206 |
| 2005/0246288 A1 | 11/2005 | Kimura et al. | | |
| 2010/0023644 A1* | 1/2010 | Laffra | ............... | G06F 11/3664 709/232 |
| 2011/0261398 A1* | 10/2011 | Mihara | ............... | H04N 1/00464 358/1.15 |
| 2011/0261401 A1* | 10/2011 | Yabe | ............... | G06F 3/1203 358/1.15 |
| 2011/0279845 A1 | 11/2011 | Sako | | |
| 2012/0069382 A1* | 3/2012 | Osada | ............... | G03G 15/502 358/1.14 |
| 2012/0113453 A1* | 5/2012 | Ito | ............... | H04N 1/00244 358/1.13 |
| 2013/0238391 A1* | 9/2013 | Klumpp | ............... | G06Q 30/02 705/7.29 |
| 2015/0341249 A1* | 11/2015 | Shiihara | ............... | H04L 67/02 709/203 |

FOREIGN PATENT DOCUMENTS

| | | |
|---|---|---|
| JP | 2008003833 A | 1/2008 |
| JP | 2011049804 A | 3/2011 |
| JP | 2011142608 A | 7/2011 |
| JP | 2011-239337 A | 11/2011 |
| JP | 2012066453 A | 4/2012 |

OTHER PUBLICATIONS

Office Action in counterpart Chinese Patent Application No. 201510059896.5 dated Jun. 1, 2017 (15 pages).

\* cited by examiner

FIG. 15

| n | k |
|---|---|
| 2 | 2 |
| 3 | 2 |
| 4 | 3 | ns, finish display of a web page including the script.
OPERATION PROCESSING DEVICE, METHOD FOR CONTROLLING INFORMATION DEVICE, AND COMPUTER-READABLE STORAGE MEDIUM FOR COMPUTER PROGRAM This application is based on Japanese patent application No. 2014-020929 filed on Feb. 6, 2014, the contents of which are hereby incorporated by reference.

BACKGROUND OF THE INVENTION

1. Field of the Invention

The present invention relates to a technology for controlling an information device by using a web browser.

2. Description of the Related Art

Web technologies have been used to enable remote access to Multi-functional Peripherals (MFPs) which are composite information devices. An MFP accessed from a remote location is connected through a network to user terminals directly operated by users. Information devices, such as a personal computer and smartphone, used as the user terminals are provided with a web browser.

The web browser of the user terminal obtains, from a server on the network, a web page for remote access to display the web page. The user performs input operation such as function selection or operation settings, so that the input information is informed to the server. The server then sends a content corresponding to the input operation to the web browser. Upon the receipt of the content, the web browser displays the same immediately. What is displayed changes appropriately depending on the operation. When the user performs operation for giving a command to execute a process, the server creates a job to cause the MFP to execute the process designated by the user and gives the job to the MFP, and then the MFP executes the job.

A technology has been employed in which a script to cause an MFP to execute a predetermined process is embedded in a web page for remote access (Japanese Laid-open Patent Publication No. 2008-003833). According to the technology, when a user uses a user terminal to perform specific operation on a web browser, for example, operation of selecting a button associated with the script, the script is run, so that the user terminal instructs the MFP to execute the process.

Another technology has been proposed in which, while a job started based on a script is executed, receiving a command to cause screen transition given to a web browser by a user is limited (Japanese Laid-open Patent Publication No. 2011-142608). According to the technology, it is possible to prevent a script from being lost due to the transition of a screen associated with the script to another screen, and thereby to prevent job control from being disabled.

In conventional technologies, although a user hopes completion of a process controlled by a script embedded in a web page, user's operation on a web browser is limited until execution of the script is finished. Stated differently, conventional technologies do not allow a user to perform operation for finishing the web browser itself and operation for causing transition from the web page to another web page. This is because such operation suspends the script.

For this reason, after giving a command to execute a certain process, the user cannot make settings for the next process and cannot give a command to execute the next process until the current process is completely finished.

SUMMARY

The present disclosure has been achieved in light of such an issue, and therefore, an object of an embodiment of the present invention is to provide an operation environment in which a user is allowed to, before completion of script execution, finish display of a web page including the script.

A device according to one aspect of the present invention is an operation processing device used to operate an information device. The operation processing device includes a script execution portion configured to execute a script used for the operation processing device to cause the information device to perform a process in a state where a web page including the script is displayed; a display processing portion configured to finish, in response to operation for giving a command to finish display of the web page performed during execution of the script, the display of the web page in accordance with the operation; and a script continued execution portion configured to take over, when the display processing portion finishes the display of the web page, the script from the script execution portion to execute the script.

These and other characteristics and objects of the present invention will become more apparent by the following descriptions of preferred embodiments with reference to drawings.

BRIEF DESCRIPTION OF THE DRAWINGS

FIG. 15 is a diagram showing a settings example of an order "k" related to a determination routine.

DESCRIPTION OF THE PREFERRED EMBODIMENTS

In this description, an MFP is taken as an example of an information device according to an embodiment of the present invention. The MFP is a composite information device into which useful functions for office work are consolidated.

Figure 1:
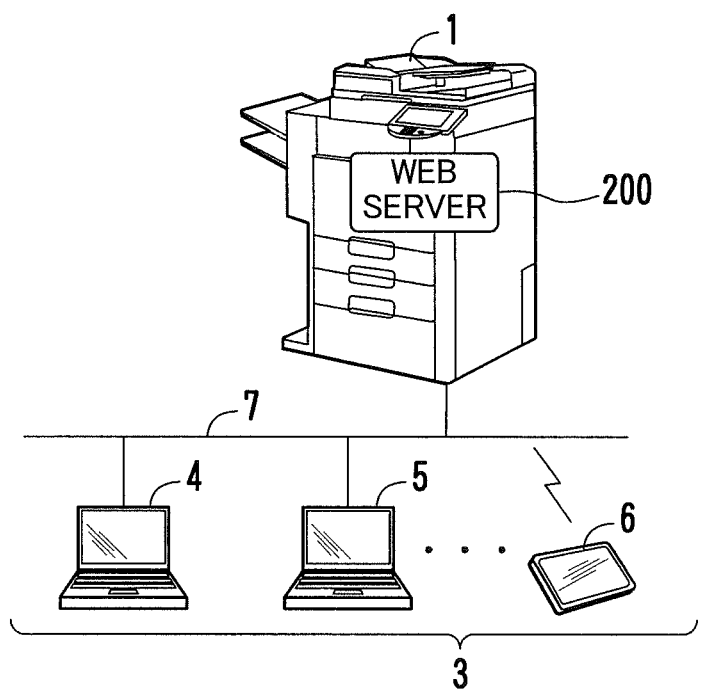
FIG. 1 is a diagram showing an example of a network having an MFP according to an embodiment of the present invention.

Referring to FIG. 1, an MFP 1 is connected to a Local Area Network (LAN) 7 constructed in a corporate office and shared by users. The LAN 7 is connected to different types of information devices including one or more user terminals 3. As shown in FIG. 1, examples of the user terminal 3 are laptop (notebook) personal computers 4 and 5, and a tablet 6. The MFP 1 is configured to perform communication with the information devices of the LAN 7 and information devices over another network. The MFP 1 is connected to a public telephone line, which enables the MFP 1 to perform facsimile communication over the public telephone line.

The MFP 1 is provided with a web server 200 related to operation on the MFP 1. The web server 200 transmits, in response to access from a web browser of the user terminal 3, a web page which is supposed to be displayed as an operating screen to the user terminal 3. The web browser of the user terminal 3 displays the web page sent by the web server 200 on a display of the user terminal 3. This provides a user with a remote access environment by means of the user terminal 3.

The web server 200 responds to access from a web browser running in the MFP 1 in a manner similar to that from the user terminal 3. The web browser of the MFP 1 causes a touch-sensitive panel display of an operating panel of the MFP 1 to display a web page obtained from the web server 200.

Figure 2:
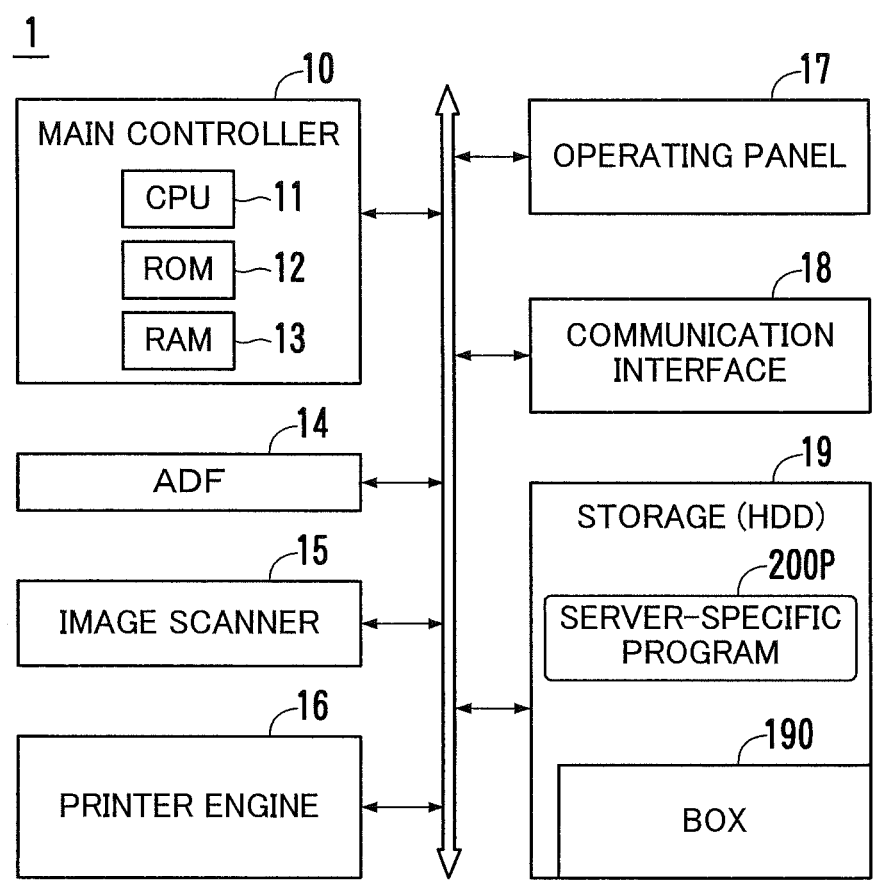
FIG. 2 is a diagram showing an outline of the hardware configuration of an MFP.

FIG. 2 is a diagram showing an outline of the hardware configuration of the MFP 1.

An Auto Document Feeder (ADF) 14 feeds a document sheet placed by a user to a scan position of an image scanner 15. The image scanner 15 optically reads an image recorded on the document sheet. In the case of copying, printing, or facsimile transmission, a printer engine 16 is operable to print an image onto paper through electrophotography. The print method may be an inkjet method or any other methods.

An operating panel 17 is provided with a touch-sensitive panel display. The touch-sensitive panel display of the operating panel 17 is configured to detect a flick gesture and a multi-touch gesture.

A communication interface 18 enables communication between the MFP 1 and an external device. The communication interface 18 includes a Network Interface Card (NIC) for connecting the MFP 1 to the LAN 7 for communication and a modem for facsimile communication via the public telephone line.

A storage 19 is, for example, a hard disk drive. The storage 19 is used to store application programs and settings data, and to temporarily store data for data processing. The storage 19 stores, therein, a server-specific application program 200P for implementing the functions of the web server 200. The storage 19 also stores, therein, registered user information to be refereed to for user authentication, and registered destination information for facsimile transmission or data transmission.

A part 190 of a memory area of the storage 19 is used as a document saving area called a BOX. The storage 19 usually has a plurality of boxes, e.g. a personal box (also called a user box) assigned to each user and a common box shared by users. The boxes are identified based on predetermined identifiers (box names or box numbers, for example).

The main controller 10 serves to control an overall operation of the MFP 1. The main controller 10 has a Central Processing Unit (CPU) 11 acting as a computer for executing a variety of programs, a Read Only Memory (ROM) 12 for storing software including an installed program for implementing the variety of functions of the MFP 1, and a Random Access Memory (RAM) 13 used as a work area for program execution.

Figure 3:
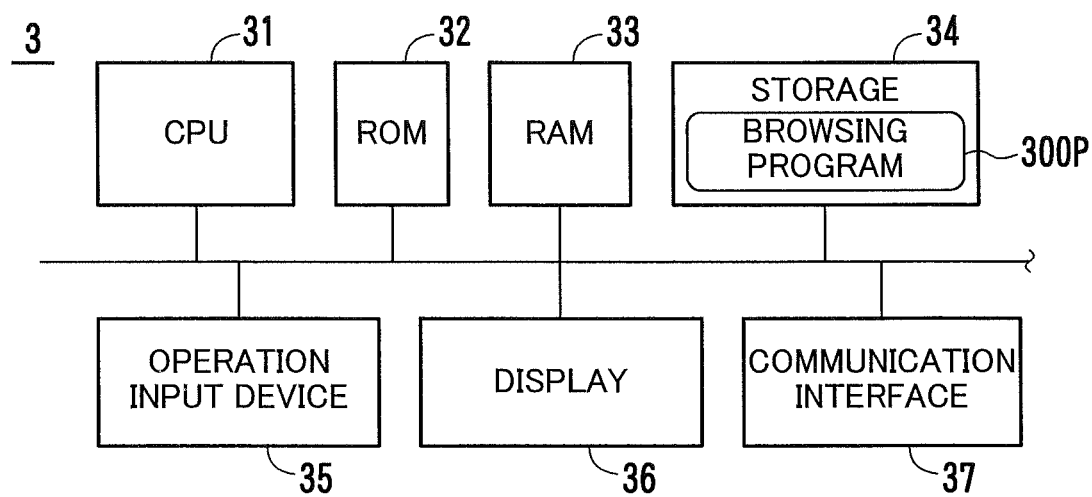
FIG. 3 is a diagram showing an outline of the hardware configuration of a user terminal.

FIG. 3 is an outline of the hardware configuration of the user terminal 3. The user terminal 3 is configured of a CPU 31, a ROM 32, a RAM 33, a storage 34, an operation input portion 35, a display 36, a communication interface 37, and so on.

The CPU 31 loads a program stored in the ROM 32 or the storage 34 into the RAM 33 to execute the loaded program. The storage 34 is a hard disk drive or a Solid State Drive (SSD). The storage 34 is configured to store a browsing program 300P therein. The program 300P can be stored into the storage 34 by downloading the same from a predetermined server or installing the same from a removable medium. A web browser implemented by execution of the program 300P by the CPU 31 corresponds to a web browser 300 (described later).

The operation input portion 35 is provided with one or more input devices for outputting a signal depending on operation by a user. For example, if the user terminal 3 is the laptop personal computer 4 or 5, the operation input portion 35 is a keyboard and a touch pad functioning as a pointing device, for example. If the user terminal 3 is a desktop personal computer, the operation input portion 35 is generally a keyboard, a mouse, and the like. If the user terminal 3 is the tablet 6, the operation input portion 35 is a touch-sensitive panel display, for example. If the user terminal 3 is configured to receive voice command operation, the operation input portion 35 is a microphone, for example.

The display 36 is, for example, a liquid crystal panel, an organic electroluminescence display, or another device capable of displaying screens. If the user terminal 3 is a desktop personal computer, the display 36 is usually a separate unit that is provided independently of a main body having the CPU 31, and the display 36 is connected to the main body through an external connection cable.

The communication interface 37 is provided with a device for wired communication and a device for wireless communication. The wireless communication includes communication which is in conformity with Wireless Local Area Network (WLAN) standards, and communication which is in conformity with Bluetooth (registered trademark) standards.

Figure 4:
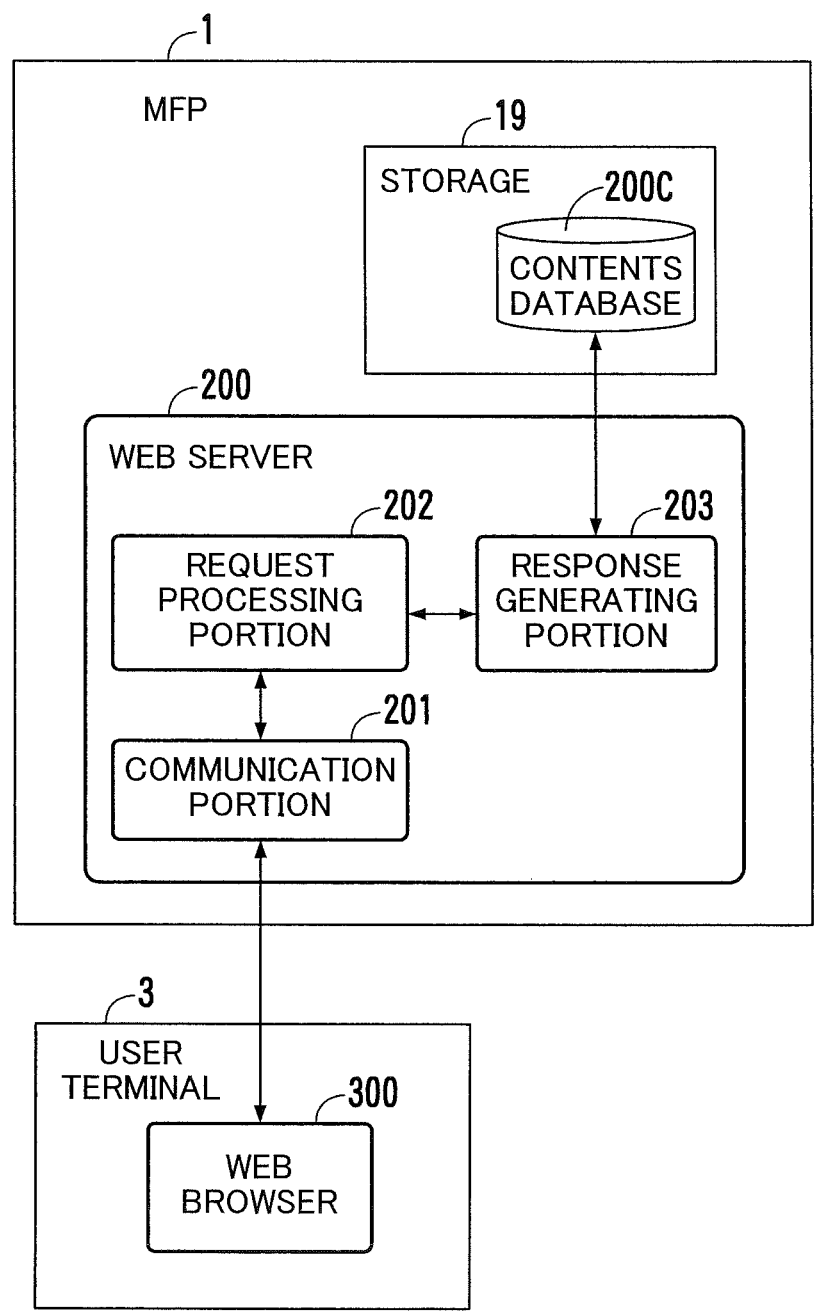
FIG. 4 is a diagram showing an example of the functional configuration of a web server.
Figure 5A:
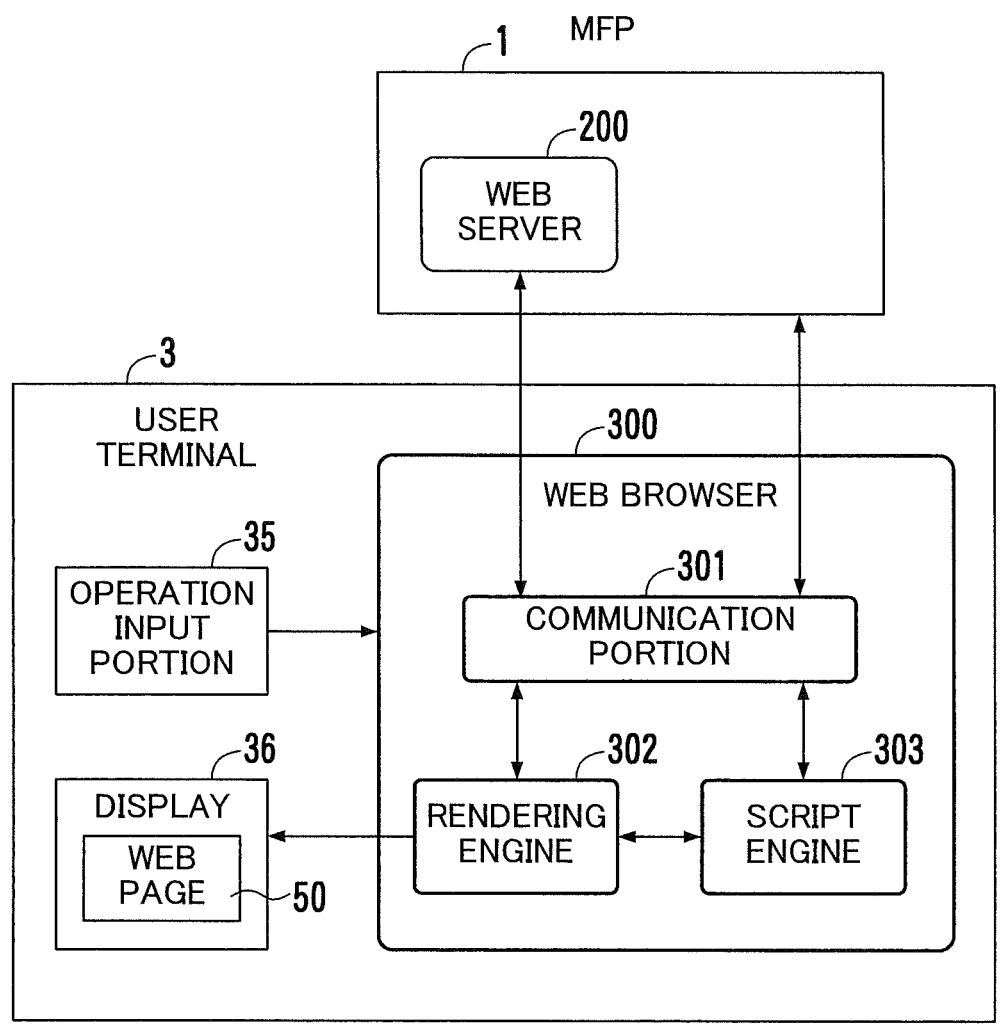
FIGS. 5A and 5B are diagrams showing an example of the functional configuration of a web browser.
Figure 5B:
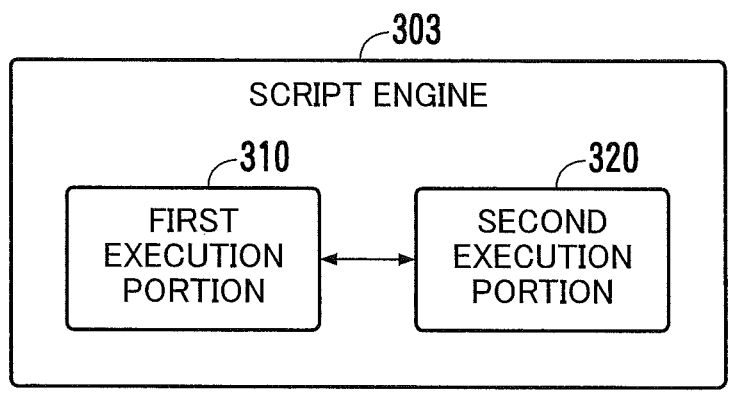

FIG. 4 shows an example of the functional configuration of the web server 200, and FIGS. 5A and 5B show an example of the functional configuration of the web browser 300. In the examples of FIGS. 4, 5A, and 5B, as a form of operation on the MFP 1, remote access from the user terminal 3 is exemplified, and the user terminal 3 works as an operation processing device for displaying a web page used for operation on the MFP 1.

As shown in FIG. 4, the web server 200 of the MFP 1 is configured of a communication portion 201, a request processing portion 202, a response generating portion 203, and so on. These portions are functional elements implemented by execution of a server-specific application program 200P by the CPU 11. The application program 200P starts automatically when the MFP 1 is turned ON. While the MFP 1 is ON, the web server 200 responds to access from the user terminal 3 at any time.

The communication portion 201 performs communication with the web browser 300 of the user terminal 3 by using a predetermined protocol such as a Hypertext Transfer Protocol (HTTP). The communication portion 201 receives data which is addressed to the web server 200, and sends, to the user terminal 3, a response which is conveyed from the request processing portion 202 and directed to the web browser 300.

The request processing portion 202 extracts, from the data received by the communication portion 201, a request from the web browser 300 and conveys the request to the response generating portion 203. The request processing portion 202 then conveys a response generated by the response generating portion 203 to the communication portion 201, and requests the communication portion 201 to send the response to the user terminal 3.

The request to be conveyed to the response generating portion 203, and the response to be generated by the response generating portion 203 are arranged to contain information identifying a transmission source of the request. This makes it possible to send the responses corresponding to the requests from the user terminals 3 accurately to the transmission sources of the requests.

The response generating portion 203 generates a response in accordance with a request inputted by the request processing portion 202 to convey the response to the request processing portion 202. If the request is to ask for transmission of data on a web page, then the response generating portion 203 generates data on the requested web page as a response. The data on web page is data in which, if necessary, a content file such as a chart file and a photo file is annexed to an HTML file having a document structure described in a Hypertext Markup Language (HML). Instead of the HTML, an Extensible Markup Language (XML) may be used as a markup language describing a document structure of a web page.

The storage 19 stores, in advance, a database 200C for contents of web pages which are to be used as operating screens. The response generating portion 203 uses known methods to combine contents registered in the database 200C, so that data on a web page is generated.

If the requested web page contains a script, then the response generating portion 203 generates, for example, an HTML file which executes a script described in JavaScript (registered trademark). The script is, for example, a so-called client-side script which checks an input error and changes the color of a button if the button is clicked on. The script is, for example, a script with which the user terminal 3 causes the MFP 1 to perform a process specified by a user (such a script being referred to as an "MFP control script").

As shown in FIG. 5A, the web browser 300 of the user terminal 3 is configured of a communication portion 301, a rendering engine 302, a script engine 303, and so on. These portions are functional elements implemented by the browsing program 300P by the CPU 31. The program 300P is launched by an operating system when a user of the user terminal 3 gives a start-up command.

The communication portion 301 performs communication with the web server 200 of the MFP 1 by using a predetermine protocol such as HTTP. The communication portion 301 sends, to the MFP 1, a request which is conveyed from the rendering engine 302 and is directed to the web server 200, and receives data which is addressed to the web browser 300. The communication portion 301 sends, to the MFP 1, an instruction which is sent from the script engine 303 and is to be given to the MFP 1.

The rendering engine 302 has a role as a display processing portion for displaying a web page on the display 36. Hereinafter, a variety of web pages displayed by the rendering engine 302 is collectively referred to as a web page 50. At the start-up of the web browser 300, the rendering engine 302 displays the web page 50 which is preset as a HOME page. Thereafter, the rendering engine 302 changes the display content in accordance with operation by a user.

The rendering engine 302 sends through the communication portion 301, to the web server 200, a request to ask for transmission of the web page 50 to be displayed. The rendering engine 302 interprets the description of HTML that is received as a response to the request, and creates page image data representing the web page 50. Based on the page image data, the web page 50 is displayed by the display 36.

The script engine 303 executes the script contained in the HTML file received by the rendering engine 302. In accordance with the script, the script engine 303 sends an operation command to the MFP 1 through the communication portion 301. As shown in FIG. 5B, the script engine 303 includes a first execution portion 310 and a second execution portion 320.

If a web page 50 includes some sort of script such as the MFP control script, in a state where the web page 50 is displayed, then the first execution portion 310 executes the script. While the MFP control script is executed, if a display change of finishing the display of the web page 50 is made, then the second execution portion 320 takes over the MFP control script from the first execution portion 310 to execute the MFP control script.

The description goes on to an operating screen displayed by the web browser 300 of the user terminal 3 in remote access to the MFP 1 from the user terminal 3. The operating screen is a web page 50 used for operation on the MFP 1.

Figure 6:
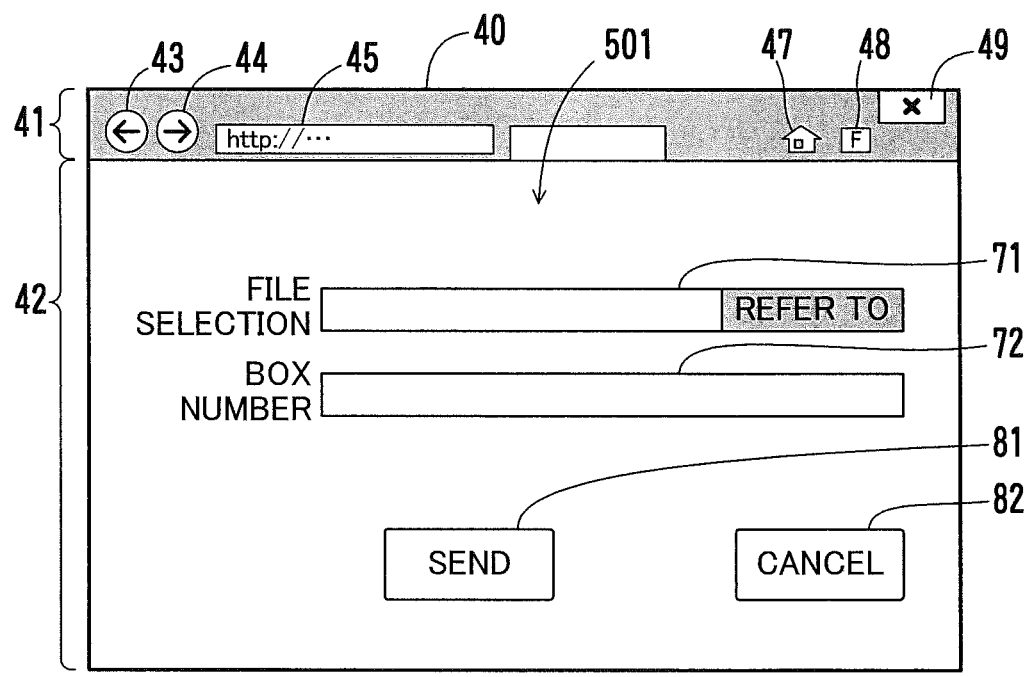
FIG. 6 is a diagram showing an example of the structure of a window opened by a web browser and a first example of an operating screen displayed in the window.

FIG. 6 shows the structure of a window 40 opened by the web browser 300. Referring to FIG. 6, the window 40 has a browsing operation area 41 provided in the upper portion thereof and a page display area 42 provided below the browsing operation area 41. The browsing operation area 41 has a back key 43, a forward key 44, an address bar 45, a home page key 47, a favorites key 48, a close key 49, and so on. The page display area 42 is to display any web page 50 obtained from the web server 200 or another web server. In the illustrated example, an operating screen 501 obtained as the web page 50 from the web server 200 is displayed in the page display area 42.

The web browser 300 switches a display target in the page display area 42 from a web page 50 to another web page 50 in accordance with operation made by the user. The details thereof are provided below. In this description, it is assumed that a key on the screen is operated by means of a mouse.

When the window 40 is opened, the web browser 300 displays a web page 50 which is preset as the home page in the page display area 42. The home page may be a web page 50 managed by the web server 200, or, any one of other web pages 50.

After the home page is displayed, for example, when any Uniform Resource Locator (URL) is entered in the address bar 45 and an enter key of a keyboard functioning as the operation input device 35 is pressed, the web browser 300 displays, instead of the home page, a web page 50 identified based on the URL entered into the address bar 45. If the favorites key 48 is clicked on, then the web browser 300 displays, as a pop-up, a list of registered web page names.

When any of the web page names of the list is clicked on, the web browser 300 displays a web page 50 corresponding to the clicked web page name in the page display area 42.

After web pages 50 are displayed sequentially, every time when the back key 43 is clicked on, the web browser 300 displays a web page 50 one earlier than the current web page 50 in the display area 42. Every time when the forward key 44 is clicked on, the web browser 300 displays a web page 50 one later than the current web page 50.

When the home page key 47 is clicked on in a state where a web page 50 other than the home page is displayed, the web browser 300 displays the home page instead of the web page 50 currently displayed.

The close key 49 is a key for the user to give a command to finish the display of the window 40, i.e., to close the window 40. When the close key 49 is clicked on, the web browser 300 closes the window 40. Closing the window 40 disappears the web page 50 which has been displayed until then. Stated differently, changing the display content by closing the window 40 is one example of finishing the display of the web page 50.

As discussed above, the web browser 300 switches a target to be displayed in the page display area 42 from a web page 50 to another web page 50 in accordance with operation on the browsing operation area 41, or closes the window 40. The user is allowed to perform operation on the browsing operation area 41 at any time independently of what is displayed in the page display area 42. Stated differently, the user is allowed to give a command to switch between display targets, and is allowed to give a command to close the window 40 as long as the window 40 is displayed. Switching between display targets, or closing the window 40 finishes displaying the web page 50 which has been displayed until then. Therefore, the operation for giving a command to switch between display targets and the operation for giving a command to close the window 40 correspond to operation for giving a command to finish displaying the web page 50 which is displayed at the time of such operation.

Referring to FIG. 6, the operating screen 501 displayed in the page display area 42 is a screen used to cause the MFP 1 to perform a process of saving an entered file into a box 190 of the MFP 1. The operating screen 501 is displayed if operation for selecting a box process is performed in a function selection screen displayed in response to approval of log-in of the user, and if a transmission process is selected in a box process selection screen displayed in response to the box process selection.

The operating screen 501 has an entry area 71 into which a file to be saved is designated, an entry area 72 into which a saving destination box is designated, a send button 81, a cancel button 82, and so on. The operating screen 501 includes an MFP control script. The MFP control script of the operating screen 501 is to cause the user terminal 3 to perform a process of sending the file designated in the entry area 71 to the MFP 1, and to cause the MFP 1 to perform a process of saving a received file to the saving destination box designated in the entry area 72.

When the user enters, into the entry area 71, a path identifying a desired file, enters, into the entry area 72, an identifier of a personal box or common box to which the desired file is to be saved, and clicks on the send button 81, the MFP control script is executed. If the user clicks on the cancel button 82 during the execution of the MFP control script, then the execution of the MFP control script is canceled.

After the user gives a command to execute the MFP control script, it sometimes takes time, for example, a few seconds or longer to completely execute the MFP control script because a heavy load is imposed on the CPU 31 of the user terminal 3, or, because the MFP 1 is placed in a sleep mode when the execution of the MFP control script is instructed. The user thus probably performs the foregoing operation for giving a command to finish displaying the web page 50 during the execution of the MFP control script (from when a command to execute the MFP control script is given to when the execution of the MFP control script is completed). In this embodiment, the script engine 303 of the web browser 300 is provided with the second execution portion 320 as discussed above. The second execution portion 320 is allowed to continue executing the MFP control script in the case of switching between display targets in accordance with the command given by the user during the execution of the MFP control script, and in the case of closing the window 40 during the execution of the MFP control script.

Figure 7:
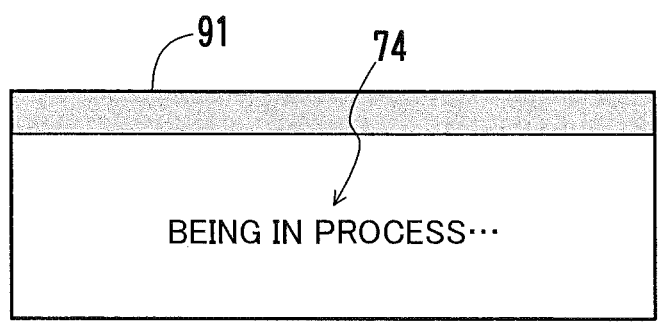
FIG. 7 is a diagram showing an example of a child window displayed while a script is executed.

FIG. 7 shows an example of a message window 91 for informing the user that the MFP control script is being executed. The message window 91 of FIG. 7 is displayed in response to the command, given by the user, to switch from a web page 50 to another web page 50 during the execution of the script of the web page 50. The message window 91 has a character string 74 informing the user that a process in accordance with the MFP control script is in progress.

When the user gives a command to switch from a web page 50 to another web page 50 during the execution of the MFP control script of the web page 50, the web browser 300 displays the other web page 50 in accordance with the command, as is the case where the MFP control script is not executed. At this time, the web browser 300 does not inquire the user whether or not it is possible to finish the display of the web page 50. This is because, if a confirmation screen for making such an inquire to the user is displayed, the user may wonder if there was a mistake in his/her operation, or wonder if an error occurred in the process based on the MFP control script. Further, making such an inquiry to the user forces him/her to take the trouble to enter a reply.

The message window 91 is displayed in a manner to avoid hiding the other web page 50 as much as possible. For example, the message window 91 is displayed above the other web page 50 in a lower part of the page display area 42. If the window 40 is smaller than a display surface of the display 36, the message window 91 may be displayed outside the window 40. The message window 91 is displayed also for the case where the close key 49 is clicked on during the execution of the MFP control script to close the window 40. At any rate, the message window 91 is closed at the completion of execution of the MFP control script.

Figure 8:
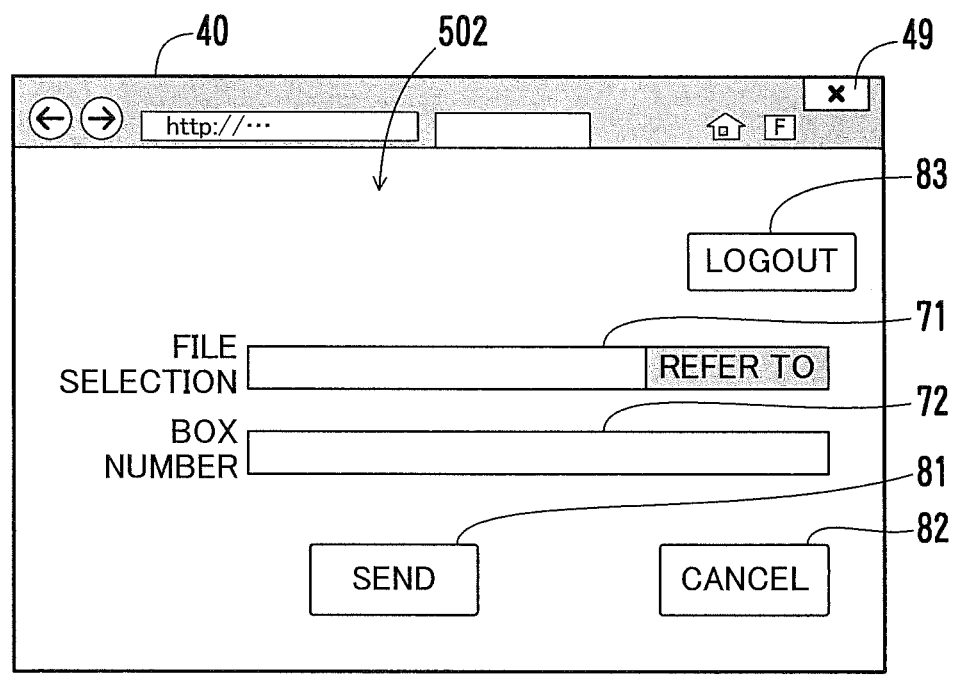
FIG. 8 is a diagram showing a second example of an operating screen displayed by a web browser.

FIG. 8 shows a second example of the operating screen displayed by the web browser. An operating screen 502 of FIG. 8 is a modification of the operating screen 501 of FIG. 6. The operating screen 502 has the entry areas 71 and 72, the send button 81, and the cancel button 82 all of which are elements similar to those of the operating screen 501 of FIG. 6. The operating screen 502 includes an MFP control script. In response to the send button 81 pressed, the MFP control script is executed.

The operating screen 502 is different from the operating screen 501 in that the operating screen 502 has a logout button 83. When the logout button 83 is clicked on, the web browser 300 sends a logout request to the web server 200. Upon receiving the logout request, the web server 200 causes the user to log out, and sends, as a response to the request, data on a web page 50 for informing the web browser 300 of the log-out. Upon receiving the response, the web browser 300 finishes the display of the operating screen 502 in the page display area 42, and, instead, displays a screen indicative of the logout. In essence, clicking on the logout button 83 is operation to give a logout command, and also operation to give a command to switch between display targets.

As described above, the operation on the page display area 42 is eventually operation for giving a command to switch between display targets. Stated differently, the operation for giving a command to switch between display targets is not limited to operation on the browsing operation area 41.

Figure 9:
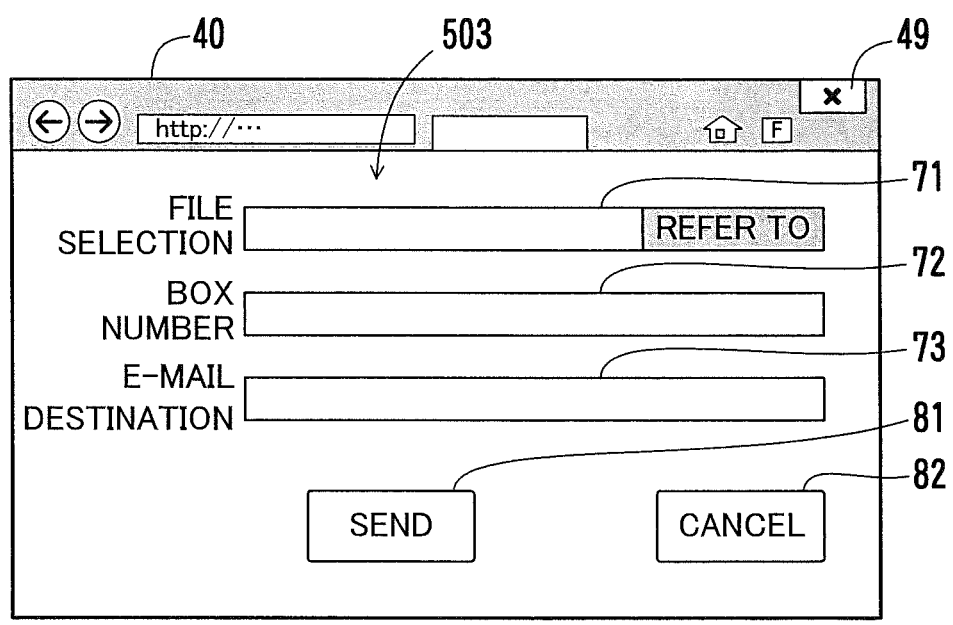
FIG. 9 is a diagram showing a third example of an operating screen displayed by a web browser.

FIG. 9 shows a third example of the operating screen displayed by the web browser. An operating screen 503 of FIG. 9 is used to cause the MFP 1 to perform a first process of saving an entered file into a box 190 of the MFP 1 and a second process of attaching the saved file to an electronic mail message to send the resultant. The operating screen 503 is displayed for the case where the user selects a send/electronic mail process in the box process selection screen.

The operating screen 503 has, in addition to the entry areas 71 and 72, the send button 81, and the cancel button 82 which are elements similar to those of the operating screen 501 of FIG. 6, an entry area 73 into which a destination of an electronic mail message is designated. The operating screen 503 includes an MFP control script. In response to the send button 81 pressed, the MFP control script is executed. The MFP control script of the operating screen 503 causes the user terminal 3 to perform a process for sending the file designated in the entry area 71 to the MFP 1. The MFP control script also causes the MFP 1 to perform the foregoing first process and second process.

In a case where another web page 50 is displayed instead of the operating screen 503 during the execution of the MFP control script of the operating screen 503, and further where the execution of the MFP control script continues, then the message window 91 of FIG. 7 is displayed.

Figure 10:
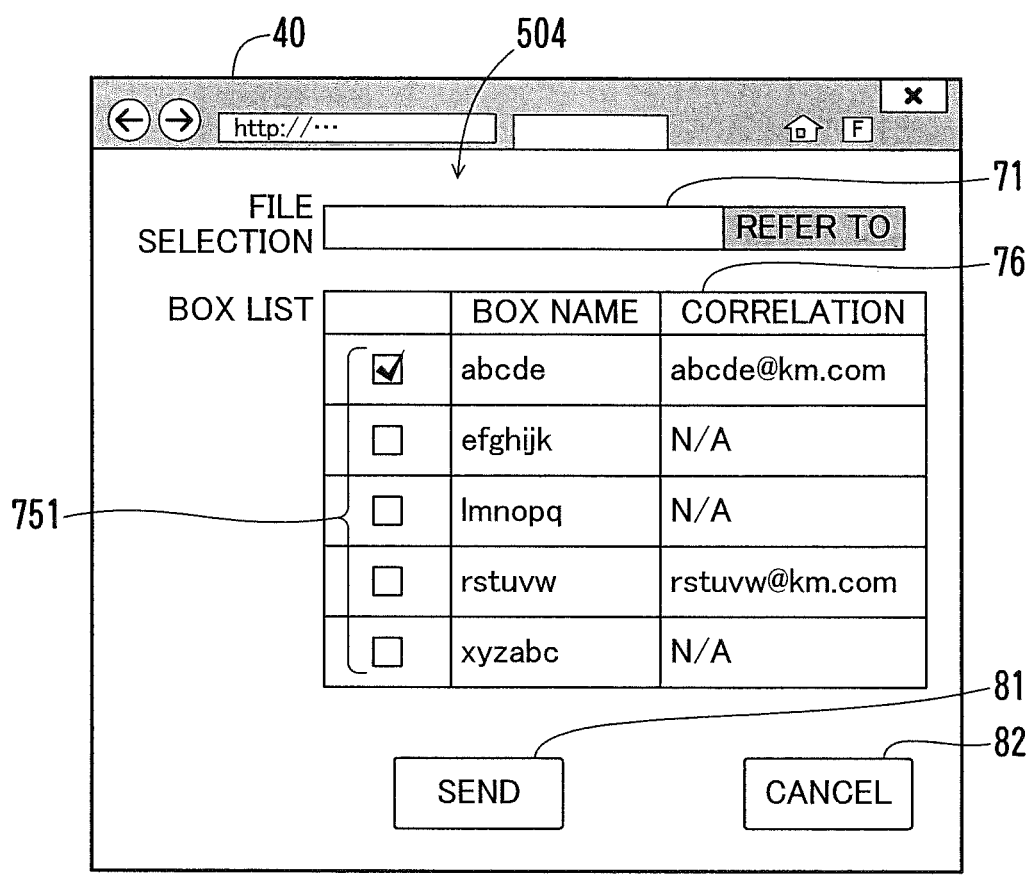
FIG. 10 is a diagram showing a fourth example of an operating screen displayed by a web browser.

FIG. 10 shows a fourth example of the operating screen displayed by the web browser. An operating screen 504 is used to cause the MFP 1 to perform a first process of saving an entered file into a box 190 of the MFP 1 and a second process of transferring a copy of the file to an address associated with the saving destination. The operating screen 504 is displayed for the case where a send/transfer process is selected in the box process selection screen.

The operating screen 504 has, in addition to the entry area 71, the send button 81, and the cancel button 82 which are elements similar to those of the operating screen 501 of FIG. 6, an entry area 76 into which a saving destination is designated. The operating screen 504 includes an MFP control script. In response to the send button 81 pressed, the MFP control script is executed. The MFP control script of the operating screen 504 causes the user terminal 3 to perform a process for sending the file designated in the entry area 71 to the MFP 1, and causes the MFP 1 to perform the first process and the second process.

The entry area 76 is an area where a list of personal boxes and common boxes that are options of the saving destination and destinations associated with the individual options is displayed in the form of table. In fields of the options in the entry area 76, checkboxes 751 are provided. The user is allowed to designate one or more saving destinations by clicking the checkboxes 751. If the user clicks the checkbox 751 to which a check mark indicating that the checkbox 751 is being selected is added, the selection is canceled to clear the checkbox 751. How to transfer a file depends on what kind of information is associated as a destination. For example, if the destination is an e-mail address, then a file is attached to an electronic mail message and the resultant is sent. If the destination is an IP address, then data is transferred by using a file transfer protocol.

In a case where another web page 50 is displayed instead of the operating screen 504 during the execution of the MFP control script of the operating screen 504, and further where the execution of the MFP control script continues, the message window 91 of FIG. 7 is displayed.

The description goes on to operation by the web browser 300 with reference to flowcharts.

Figure 11:
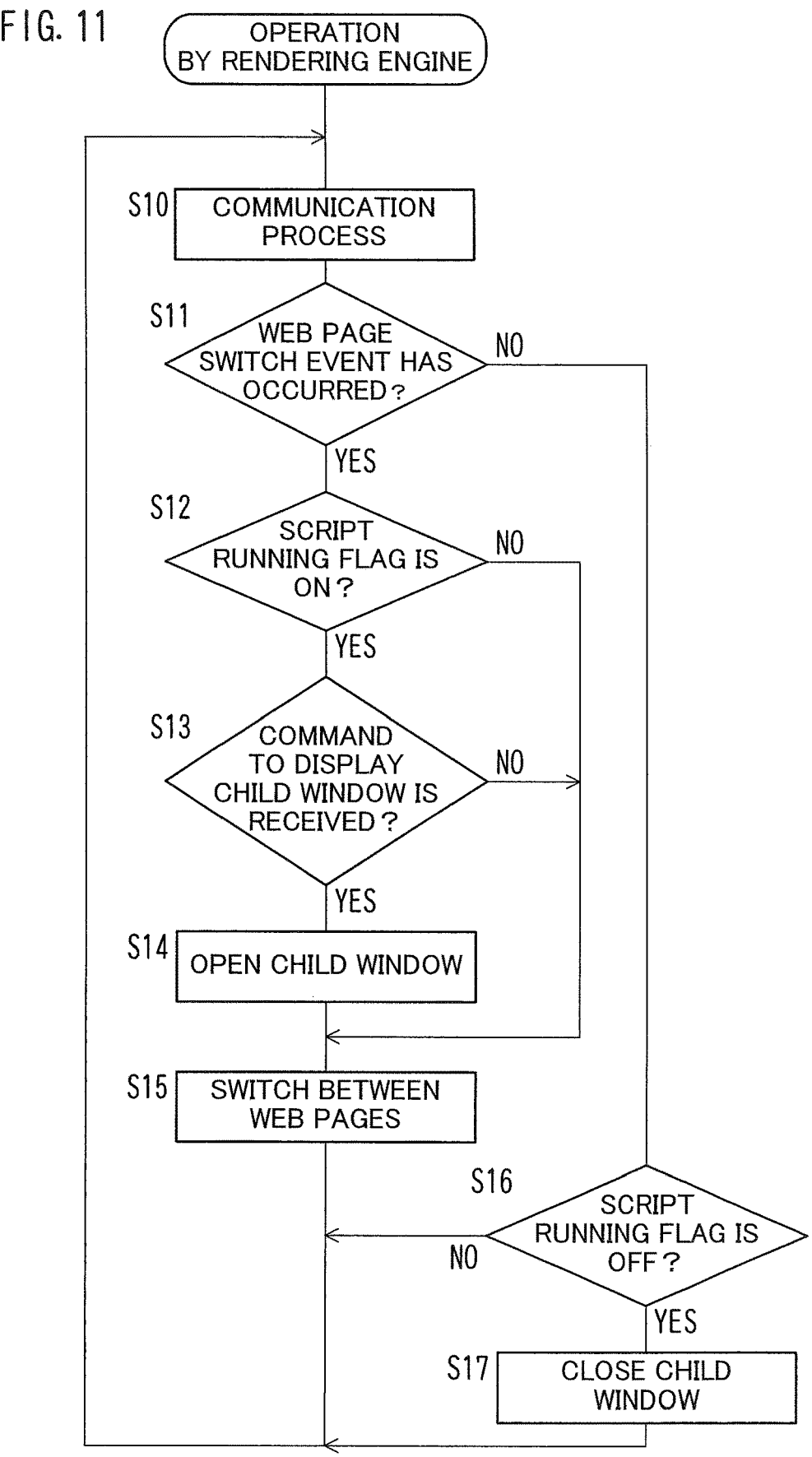
FIG. 11 is a flowchart depicting the flow of operation of a rendering engine.

FIG. 11 is a flowchart depicting an example of operation by the rendering engine 302.

The rendering engine 302 performs a communication process (Step S10). The communication process is to send a request to the web server 200 in accordance with operation by the user, and to receive a response to the request. In the communication process, the rendering engine 302 obtains operation information given by the operating system managing the operation input portion 35 to the web browser 300, creates a request depending on the details of operation indicated in the operation information, and sends the request to the web server 200. The operation information is conveyed to the script engine 303.

After the communication process, the rendering engine 302 checks whether or not a web page switch event has occurred (Step S11). The web page switch event is an HTML file input from the communication portion 301, namely, a request to display the web page 50. The web page switch event occurs when the user performs operation for giving a command to switch between display targets. The web page switch event occurs also when the home page is automatically displayed immediately after the start of the web browser 300.

If determining that a web page switch event has occurred (YES in Step S11), then the rendering engine 302 checks whether or not a script running flag is ON (Step S12). The script running flag is provided by the script engine 303 for each execution of the MFP control script. The script running flag is arranged to be switched to any one of ON and OFF by changing a value indicating the status of the script running flag. If it is determined that no web page switch event has occurred in Step S11, then the process goes to Step S16 and the process described later is performed.

If the script running flag is ON (YES in Step S12), then the rendering engine 302 checks whether or not a command to display a child window is given from the script engine 303 (Step S13). If the command to display a child window is given from the script engine 303 (YES in Step S13), then the rendering engine 302 displays, on the display 36, a child window associated with the web page 50 currently displayed (Step S14). An example of the child window is the message window 91 as shown in FIG. 7. The child window is a small screen displayed for the case where execution of the MFP control script continues when display of the web page 50 including the MFP control script is finished.

If the script running flag is not ON (NO in Step S12), then the process bypasses Step S13 and Step S14 to go to Step S15. If there is no command to display a child window (NO in Step S13), then the process bypasses Step S14 to go to Step S15.

In Step S15, the rendering engine 302 executes a web page switch process. The web page switch process is to replace the currently-displayed web page 50 with a web page 50 corresponding to the web page switch event detected in Step S11, and to display the web page 50 on the display 36. The rendering engine 302 interprets the content described in the HTML file received from the communication portion 301 to create page image data, and sends the created page image data to a controller of the display 36. The process goes back to Step S10 from Step S15.

On the other hand, if it is determined that no web page switch event has occurred (NO in Step S11), then the rendering engine 302 checks whether or not the script running flag is OFF (Step S16). If the script running flag is OFF (YES in Step S16), then the rendering engine 302 closes the currently-displayed child window (Step S17). At this time, the rendering engine 302 examines the value of a predetermined register showing the open state of the child window to detect the currently-opened child window. If no child window is open, then the process bypasses Step S17 and returns to Step S10.

If the script running flag is not OFF in Step S16, then the process returns to Step S10 from Step S156.

If a plurality of child windows is opened, each of the script running flags provided for the child windows is checked in Step S16. The child window which corresponds to a script running flag being OFF is closed in Step S16, and a child window which corresponds to a script running flag being ON is not closed.

Figure 12:
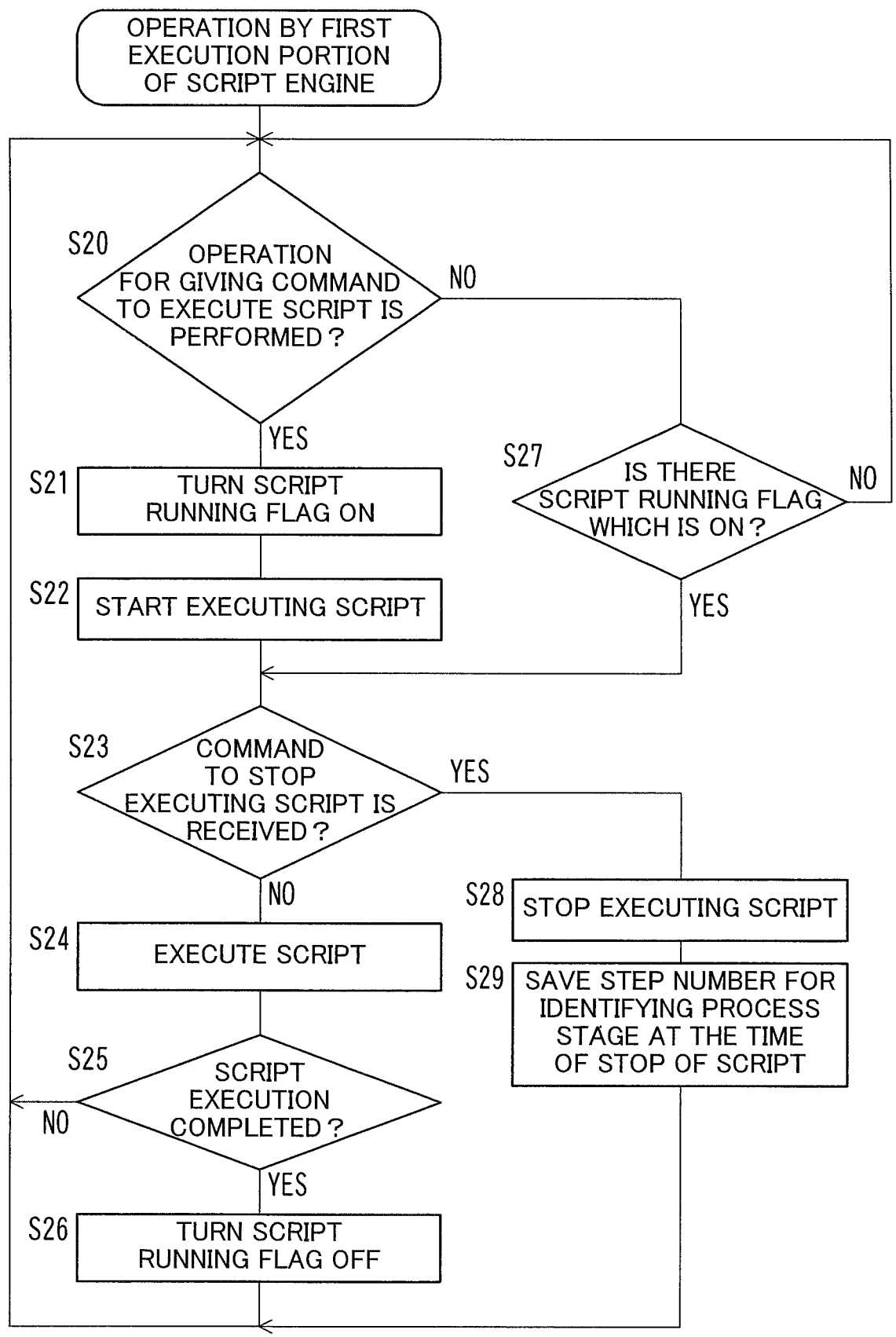
FIG. 12 is a flowchart depicting the flow of operation by a first execution portion of a script engine.

FIG. 12 is a flowchart depicting the flow of operation by the first execution portion 310 of the script engine 303.

The first execution portion 310 of the script engine 303 checks whether or not operation for giving a command to execute the MFP control script included in the web page displayed has been performed (Step S20). To be specific, the first execution portion 310 checks whether or not operation indicated in the latest operation information conveyed appropriately by the rendering engine 302 is operation on a specific content described in the HTML file which is a trigger to execute the MFP control script. For example, in the operating screen 501 of FIG. 6, clicking on the send button 81 corresponds to the operation on a specific content.

If the check result of Step S20 is NO, then it is checked whether or not there is a script running flag which is ON (Step S27). Since the script running flag is provided for each execution of the MFP control script, it is probable that some of script running flags corresponding to the MFP control scripts of which execution started before are ON. If there is no script running flag which is ON (NO in Step S27), then the process returns to Step S20. If there is at least one script running flag which is ON (YES in Step S27), then the process goes to Step S23.

If the check result of Step S20 is YES, then the first execution portion 310 provides a new script running flag corresponding to the MFP control script of which execution is instructed, and turns the script running flag ON (Step S21). The first execution portion 310 starts executing the MFP control script (Step S22).

In Step S23, the first execution portion 310 checks whether or not a stop command is given by the second execution portion 320. Since a plurality of MFP control scripts is sometimes executed in parallel with one another, the stop command contains information specifying a MFP control script to be stopped. If the stop command is given (YES in Step S23), then the first execution portion 310 stops the execution of the MFP control script specified in the stop command (Step S28), and saves a Step number for identifying the stage of process at the time when the execution of the MFP control script is stopped (Step S29). Thereafter, the process returns to Step S20.

If it is determined, in Step S23, that no stop command is given (NO in Step S23), then the first execution portion 310 pursues the execution of the MFP control script (Step S24), thereby to check whether or not the execution is completed (Step S25). If the execution is completed (YES in Step S25), then the first execution portion 310 turns the script running flag OFF corresponding to the MFP control script of which execution is completed (Step S26). If the execution is not completed (NO in Step S25), then the process returns to Step S20 and goes again to Step S24, which continues the execution of the MFP control script.

Figure 13:
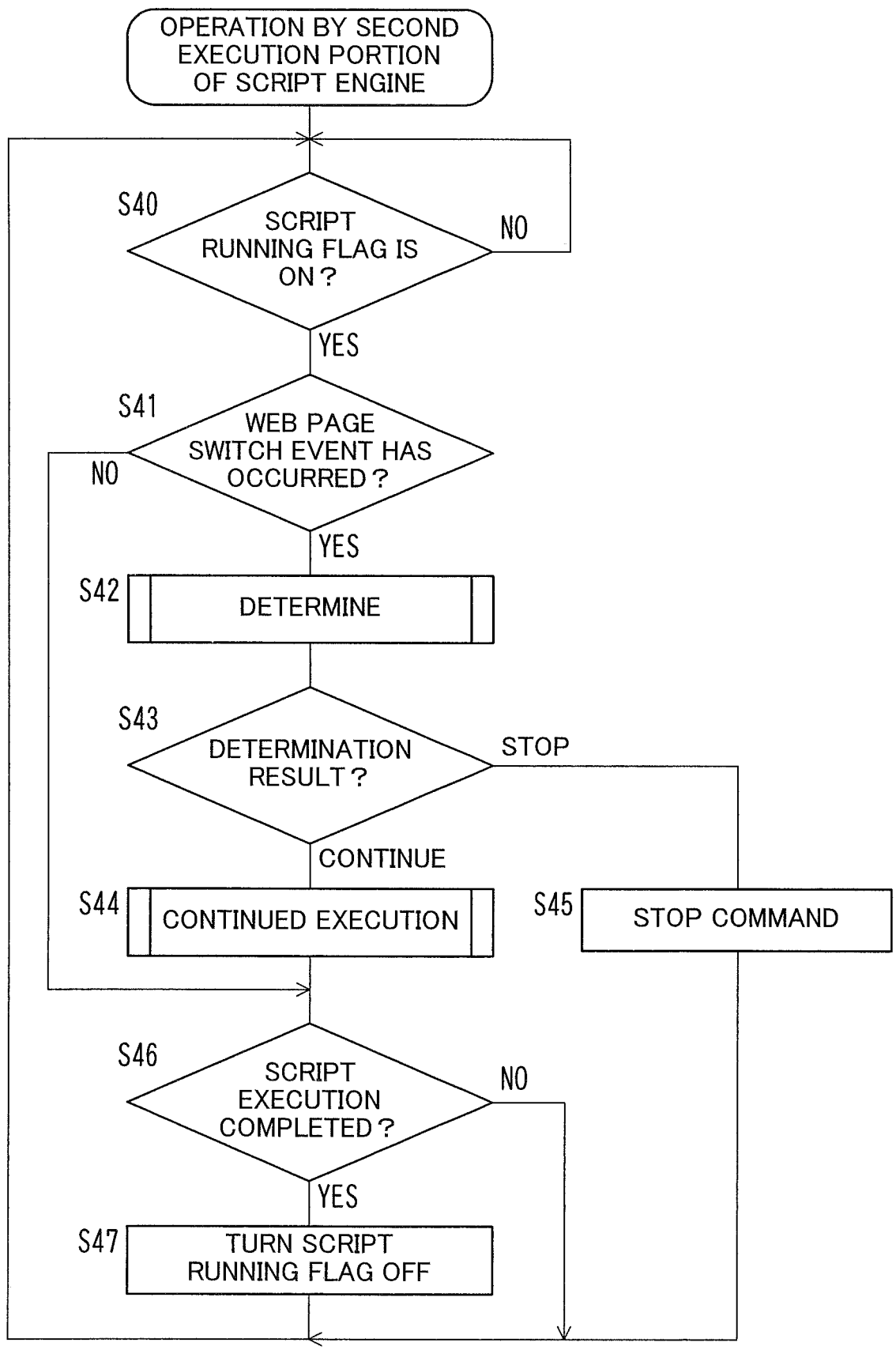
FIG. 13 is a flowchart depicting the flow of operation by a second execution portion of a script engine.

FIG. 13 is a flowchart depicting the flow of operation by the second execution portion 320 of the script engine 303.

The second execution portion 320 of the script engine 303 checks whether or not there is a script running flag that is ON (Step S40). If there is no script running flag that is ON (NO in Step S40), then the check of Step S40 is repeated. If there is at least one script running flag that is ON (YES in Step S40), then the process goes to Step S41. In short, the second execution portion 320 performs the following process while the MFP control script is executed.

In Step S41, the second execution portion 320 checks whether or not the foregoing web page switch event has occurred. If no web page switch event has occurred (NO in Step S41), then the process goes to Step S46.

If the web page switch event has occurred (YES in Step S41), then the second execution portion 320 executes a determination routine (Step S42). In the determination routine, the second execution portion 320 makes, as a determination target, an MFP control script which corresponds to a script of the currently-displayed web page 50 (web page before transition) and is currently executed, and determines whether or not to continue or stop the execution of the MFP control script.

Depending on the determination result of the determination routine, to which way the second execution portion 320 pursues the process is determined (Step S43). If the determination result is "continue", then the second execution portion 320 executes a continued execution routine (Step S44). In such a case, the process goes from Step S44 to Step S46. On the other hand, if the determination result is "stop", then the second execution portion 320 instructs the first execution portion 310 to stop the execution of the MFP control script as the determination target (Step S45). In such a case, the process goes back to Step S40.

In Step S46, the second execution portion 320 checks whether or not the execution of the MFP control script which is caused to continue in the continued execution routine is completed. If the check result is YES, then the second execution portion 320 turns the script running flag corresponding to the MFP control script of which the execution is completed OFF (Step S47). Thereafter, the process returns to Step S40.

Figure 14:
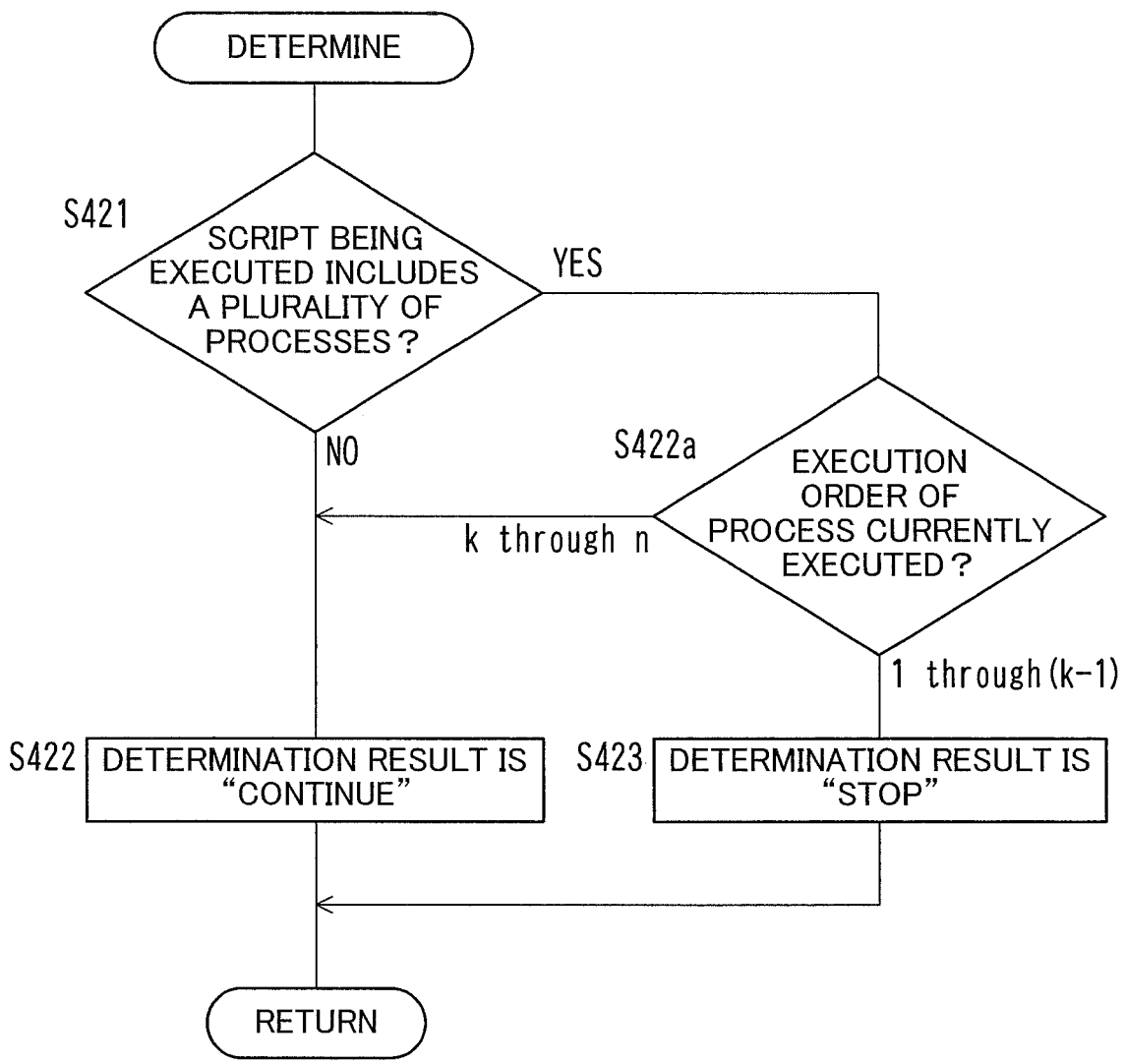
FIG. 14 is a flowchart depicting the flow of a determination routine executed by a second execution portion.

FIG. 14 is a flowchart of the determination routine of FIG. 13.

The second execution portion 320 checks whether or not the MFP control script, which is determined to be currently executed because the script running flag is ON, is a script which causes the MFP 1 to perform a plurality of processes (Step S421). The "process" herein is operation by the MFP 1 which is recognized as one work by the user, and execution of the process can be designated by the user in the operating screen.

For example, operation designated in the operating screen 503 of FIG. 9, namely, the operation of "saving an inputted file into a box 190, attaching the saved file to an electronic mail message, and sending the resultant" is operation for performing the first process of saving into a box 190 and the second process of transmission through e-mail.

On the other hand, operation designated in the operating screen 501 of FIG. 6, namely, the operation of "saving an inputted file into a box 190" is operation for performing a single process. The operation of "saving an inputted file into a box 190" actually involves various processes such as communication with the input destination, and data transfer in the MFP 1. However, the various processes is not operation recognized as one work by the user. Therefore, in the check of Step S421, the operation of "saving an inputted file into a box 190" is handled as a single process.

If it is determined that the MFP control script is not a script which causes the MFP 1 to perform a plurality of processes (NO in Step S421), then the second execution portion 320 sets "continue" as the determination result (Step S422). In other words, it is determined that, as for the MFP control script which causes the MFP 1 to perform a single process, the execution continues always for the case where the display of the corresponding web page 50 is finished.

In contrast, if the MFP control script is a script which causes the MFP 1 to perform a plurality of processes (YES in Step S421), then the determination result depends on the execution order of the process currently executed. To be specific, in the case where the MFP control script is a script which causes the MFP 1 to perform "n" (n≥2) processes, and where the order of execution of the process currently executed is any one of orders that are a preset order "k" (k≥2) except the top and orders following the preset order, then the second execution portion 320 sets "continue" as the determination result (Step S422*a*, Step S422). If the order of execution of the process currently executed is any one of orders from the first order through the (k−1)th order, then the second execution portion 320 sets "stop" as the determination result (Step S422*a*, Step S423).

Making the determination results differ from one another depending on the order of execution of process is based on the following presumption. To be specific, a case where operation for changing to another web page 50 is performed after a predetermined time has elapsed since the user caused the MFP 1 to execute the MFP control script of the current web page 50 is probably a case where the user erroneously thinks that the execution of the MFP control script is finished. In other words, the user probably hopes that the MFP 1 completes the plurality of processes designated. In such a case, the execution of the MFP control script is continued. In contrast, a case where operation for changing to another web page 50 is performed immediately after the user causes the MFP 1 to execute the MFP control script of the current web page 50 is probably a case where the user does not hope completion of the process and performs operation for giving a command to finish the display of the current web page 50 with the intention to cancel the command to execute the MFP control script. In such a case, the execution of the MFP control script is stopped.

Figure 15:
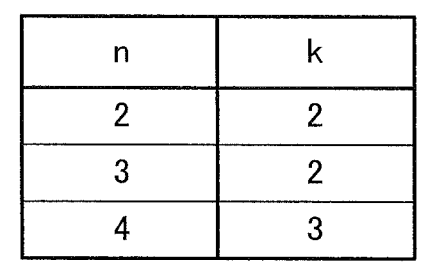

As shown in FIG. 15, the value of the order "k" influencing the determination result may be set depending on the number "n" of processes. It is preferable that, in the check of Step S422*a*, the second execution portion 320 obtains the value of "n" determined while the first execution portion 310 executes the MFP control script, and based on the value of "k" set for the value of "n", a determination is made as to whether or not the execution order "x" (1≤x≤n) of the process currently executed falls within the range between 1 and k or between 1 and (k−1).

Figure 16:
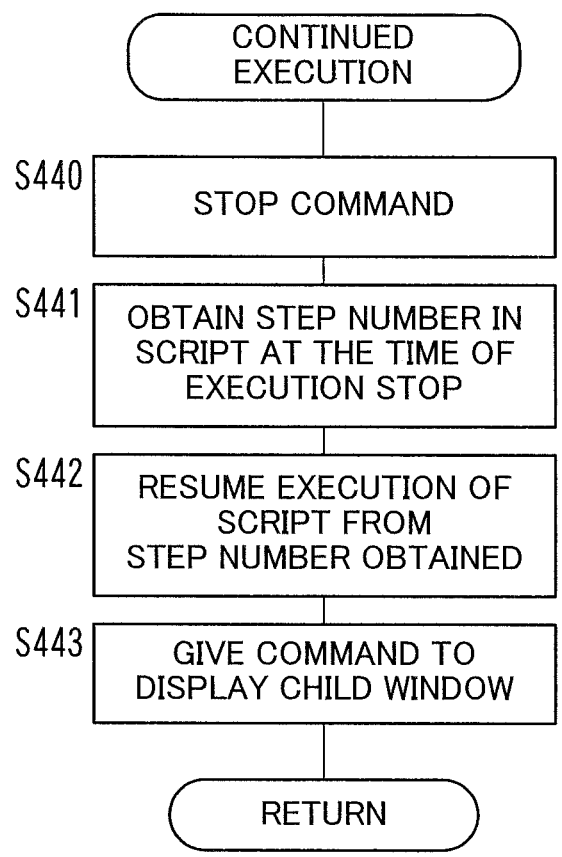
FIG. 16 is a flowchart depicting the flow of a continued execution routine executed by a second execution portion.

FIG. 16 is a flowchart depicting the flow of the continued execution routine of FIG. 13.

The second execution portion 320 instructs the first execution portion 310 to stop the execution of the MFP control script used as the determination target in the determination routine (Step S440), and obtains the step number at the time of execution stop saved by the first execution portion 310 (Step S441). The second execution portion 320 resumes the execution of the MFP control script from the step number obtained (Step S442) and instructs the rendering engine 302 to display a child window (Step S443).

Figure 17:
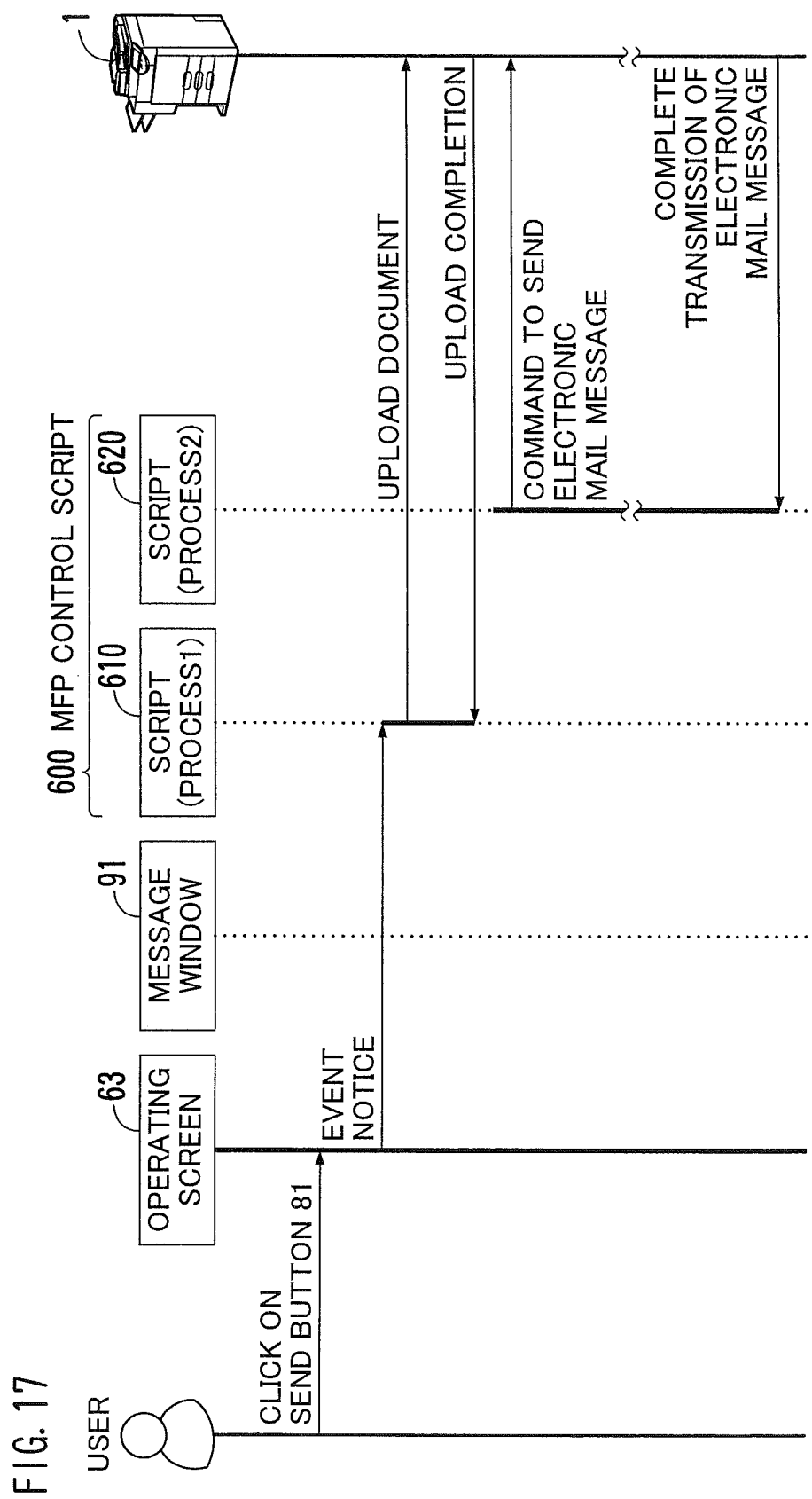
FIG. 17 is a sequence diagram showing a first example of remote access.
Figure 18:
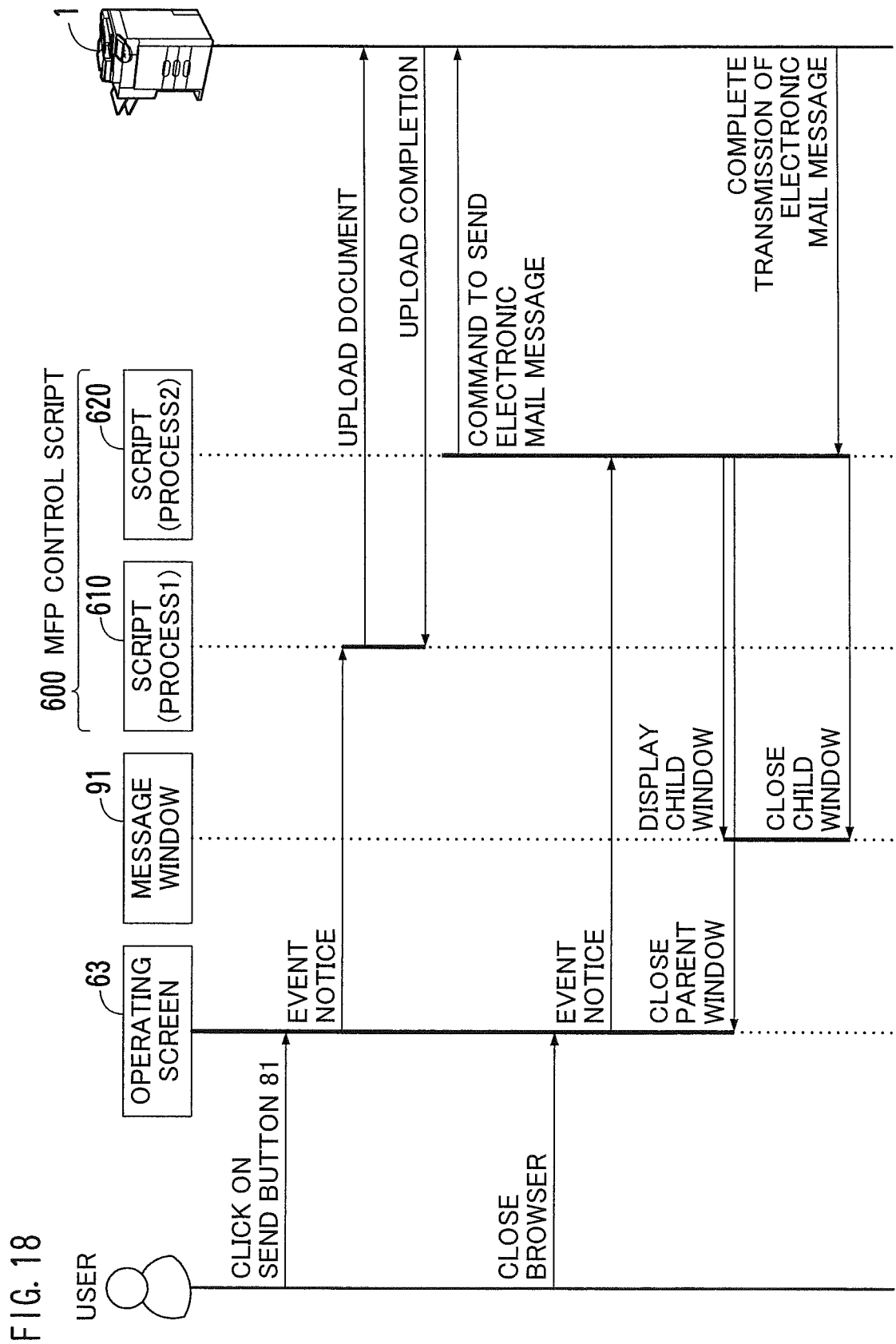
FIG. 18 is a sequence diagram showing a second example of remote access.

FIGS. 17 and 18 show examples of remote access using the web browser 300 running as discussed above. In the exemplified remote access, an MFP control script 600 included in the operating screen 503 of FIG. 9 is executed. The MFP control script 600 includes a part 610 which causes the MFP 1 to save a received document (process #1) and a part 620 which causes the MFP 1 to send the received document thorough electronic mail (process #2). In the example of FIG. 17, operation related to display of the web page 50 is not performed during the execution of the MFP control script 600. In the example of FIG. 18, the operation related to display of the web page 50 is performed during the execution of the MFP control script 600.

In FIG. 17, it is assumed that the operating screen 503 is already displayed, and the user finishes designating a document to be saved, a saving destination box, and a transmission destination of an electronic mail message. In this state, when the user clicks on the send button 81, the script engine 303 receives an event notice indicating the same to start executing the MFP control script 600.

First, in the MFP control script 600, the part 610 corresponding to the process #1 is executed. Thereby, a file of the document designated by the user with the user terminal 3 is uploaded to the MFP 1 and saved to the box designated by the user. After that, the MFP 1 informs the script engine 303 of the upload completion. The execution of the part 610 is normally finished by receiving the receipt of an upload completion notice.

Next, in the MFP control script 600, the part 620 corresponding to the process #2 is executed. Thereby, transmission of an electronic mail message is instructed to the MFP 1 by the user terminal 3. The document saved to the MFP 1 in response to the instruction is attached to an electronic mail message, and the resultant is sent. After the completion of transmission, the MFP 1 informs the script engine 303 of the transmission completion. The execution of the part 620 is normally finished by receiving a transmission completion notice.

Referring to FIG. 18, operation performed from when the user clicks on the send button 81 to when the completion of document upload is informed is similar to that of the example of FIG. 17. After the execution of the part 610 of the MFP control script 600 is finished, the part 620 corresponding to the process #2 is subsequently executed. Thereby, transmission of an electronic mail message is instructed to the MFP 1 by the user terminal 3. In the example of FIG. 18, during a period from when the MFP 1 is instructed to send an electronic mail message to when the MFP 1 sends the electronic message to inform the transmission completion, the user performs operation related to display of the web page 50, i.e., operation of clicking on the close key 49.

When being informed of the web page switch event, the script engine 303 instructs the rendering engine 302 to display a child window. In accordance with the instruction, the rendering engine 302 displays the message window 91 as the child window. At this time, the script engine 303 cooperates with the first execution portion 310 and the second execution portion 320 to continue the execution of the MFP control script 600.

After displaying the message window 91, the rendering engine 302 closes the window 40 as a parent window in response to the close key 49 clicked on by the user. Thereafter, the MFP 1 finishes sending an electronic mail message to which the document is attached. The execution of the MFP control script 600 is finished by receiving a transmission completion notice. The rendering engine 302 then closes the message window 91 (child window).

Figure 19:
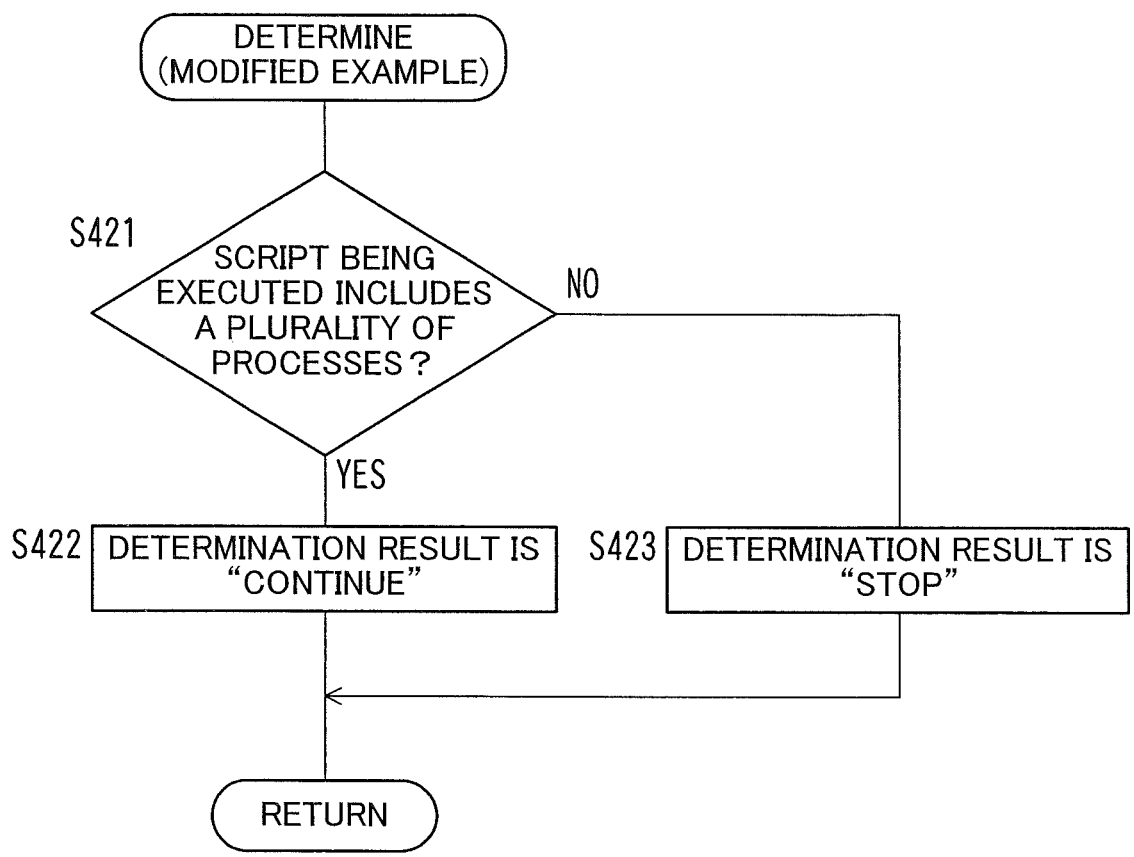
FIG. 19 is a flowchart showing a modified example of the determination routine.

FIG. 19 is a flowchart depicting a modified example of the determination routine of FIG. 13.

The second execution portion 320 checks whether or not the MFP control script 600 currently executed is a script which causes the MFP 1 to execute a plurality of processes (Step S421). If determining that the MFP control script is the script which causes the MFP 1 to execute a plurality of processes (YES in Step S421), then the second execution portion 320 sets, as the determination result, "continue" (Step S422). On the other hand, if determining that the MFP control script is not the script which causes the MFP 1 to execute a plurality of processes (NO in Step S421), then the second execution portion 320 sets, as the determination result, "stop" (Step S423). In other words, the second execution portion 320 determines that, as for the MFP control script 600 which causes the MFP 1 to perform a single process, execution thereof is stopped for the case where display of the corresponding web page 50 is finished.

Figure 20:
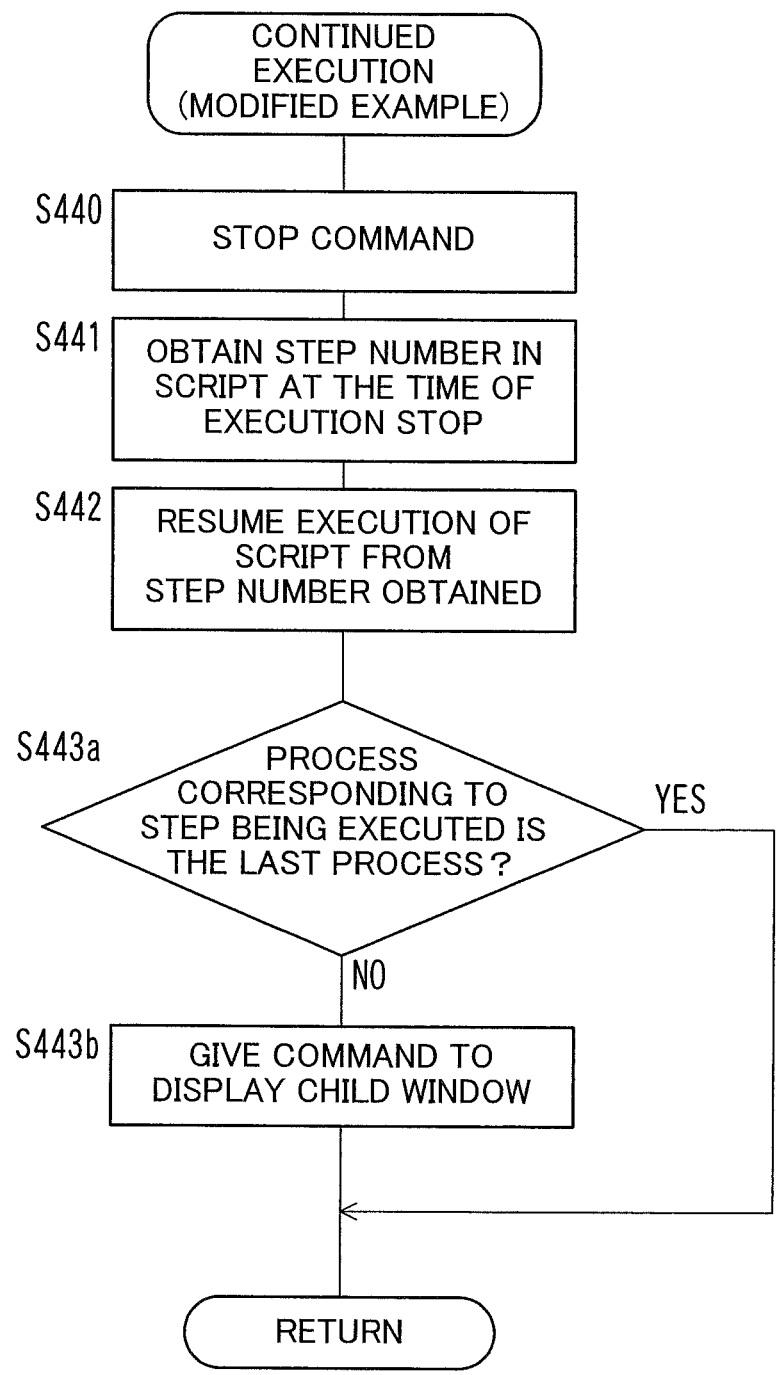
FIG. 20 is a flowchart showing a modified example of the continued execution routine.

FIG. 20 is a flowchart depicting a modified example of the continued execution routine of FIG. 13.

The second execution portion 320 instructs the first execution portion 310 to stop the execution of the MFP control script used as the determination target in the determination routine (Step S440), and obtains the step number at the time of execution stop saved by the first execution portion 310 (Step S441). The second execution portion 320 resumes the execution of the MFP control script from the step number obtained (Step S442).

In resuming the execution of the MFP control script, the second execution portion 320 checks whether or not a process corresponding to the step executed by the MFP control script is the last process of processes which are caused to be executed by the MFP 1 (Step S443a). If the MFP control script is a script which causes the MFP 1 to execute a single process, then the single process is regarded as the last process.

If a process corresponding to the step executed by the MFP control script is not the last process (NO in Step S443a), then the second execution portion 320 instructs the rendering engine 302 to display a child window (Step S443b).

If the process corresponding to the step executed by the MFP control script is the last process (YES in Step S443a), then the display of the child window is not instructed, and the process returns to the flow of FIG. 14. In such a case, the display of the child window is omitted. This is because the necessity to let the user know the continued execution of the MFP control script is small because it does not seem to take so long to finish executing the MFP control script. If a child window is not to open like this example, the user will not be confused by unexpected situation where a child window is opened when the user gives a command to switch between web pages.

Figure 21:
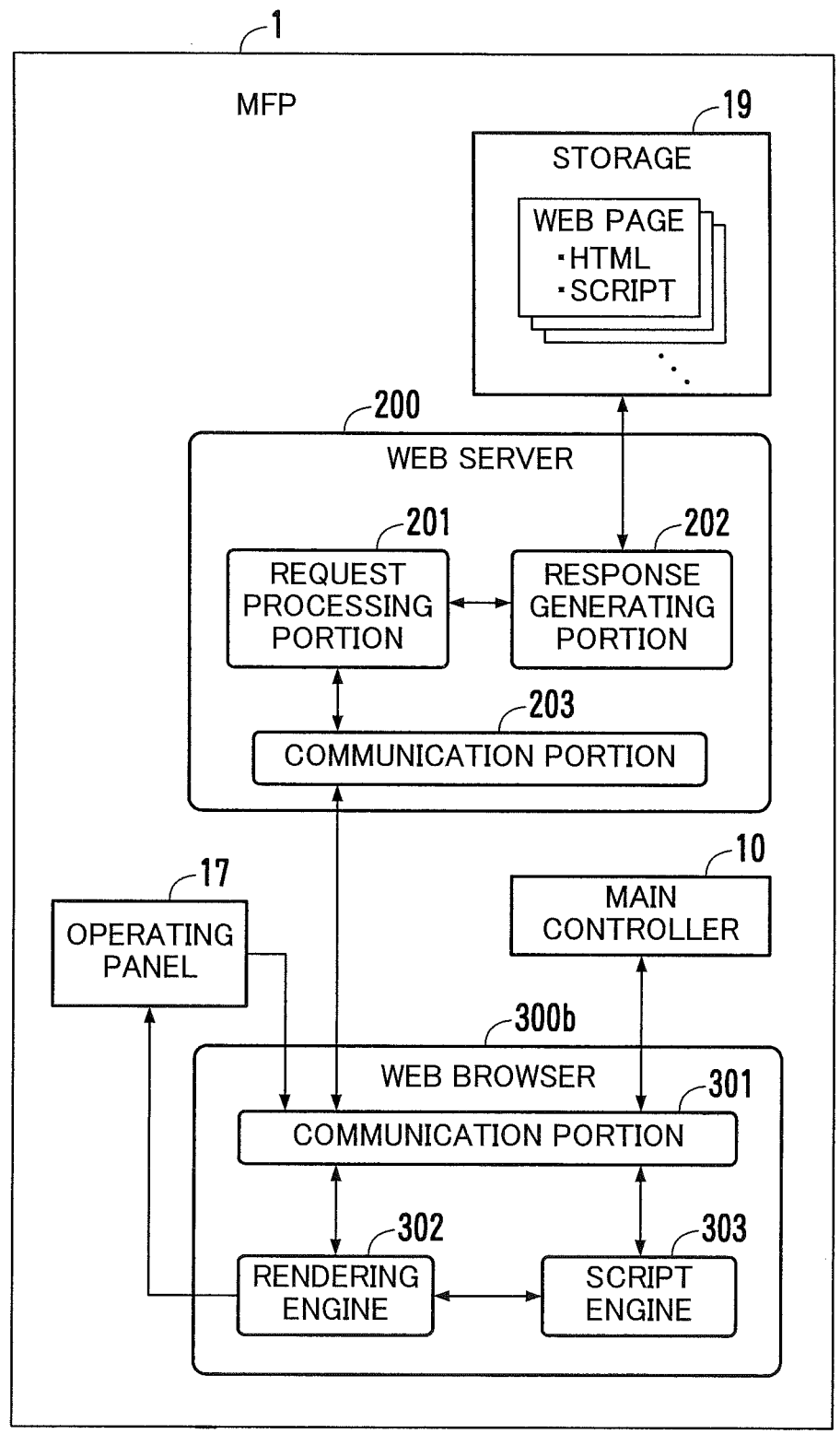
FIG. 21 is a diagram showing another example of the functional configuration of a main part of an MFP.

FIG. 21 is a diagram showing another example of the functional configuration of the main part of the MFP 1. In the example of FIG. 21, a web browser 300b runs in the MFP 1. The web browser 300b has a configuration similar to that of the web browser 300 of FIG. 5. The web browser 300b obtains, from the web server 200 of the MFP 1, a web page 50 which is to be any one of the operating screens 501, 502, 503, and 504, and displays the web page 50 on a display of the operating panel 17.

The script engine 303 of the web browser 300b executes the MFP control script 600 included in the web page 50. While executing the MFP control script 600, the script engine 303, for example, requests the main controller 10 to control the MFP 1 to perform the process designated by the user, and receives a notice of process completion from the main controller 10.

The foregoing embodiment may be modified as follows. The web server 200 is provided with a service function to receive, from the web browser 300, a request generated by execution of the MFP control script 600. The service function enables the user terminal 3 to cause the MFP 1 to perform a predetermined process.

According to the forgoing embodiment, in operating an information device by means of a web browser, a user is allowed to, before completion of script execution, finish display of a web page 50 including the script. To be specific, in a case where the MFP control script 600 which is automatically executed in response to display of the web page 50 is included in the web page 50, the user is allowed to finish the display of the web page 50 without stopping the execution of the MFP control script 600. When the display of the web page 50 is finished, execution of a script other than the MFP control script 600 may be stopped. This reduces the resource load (CPU availability, memory usage, and window size) in the user terminal 3.

In the foregoing embodiment, the configuration is provided in which the MFP 1 is provided with the web server 200. However, it is not always necessary to provide the web server 200 in the MFP 1. The web server 200 can be provided in, for example, another information device such as a server machine or another MFP. In such a case, the web browser 300 of the user terminal 3 is configured to obtain the web page 50 from the web server 200 external to the MFP 1. When the MFP control script 600 included in the web page 50 is executed, the user terminal 3 causes the MFP 1 to perform a designated process.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An operation processing device used to operate an information device, the operation processing device comprising:
   an operation input portion that receives a user operation;
   a storage that stores a web browser comprising a script engine;
   a display portion that displays, in a window of a browser, a web page including a script used to cause the information device to perform processing; and
   a hardware processor configured to execute, using a first execution portion of the script engine, the script in a state where the web page is displayed,
   wherein in response to the user operation of closing the window of the web page or the user operation of causing transition to a different web page during execution of the script, the hardware processor is further configured to:
      determine whether the script is used by the operation processing device to cause the information device to perform a plurality of processes in order,
      upon determining that the script is used to cause the information device to perform the plurality of processes in order, obtain an execution order of the process currently being executed, using a second execution portion of the script engine, wherein the execution order is determined while the first execution portion executes the script, upon determining that the script is not used to cause the information device to perform the plurality of processes in order, or upon determining that the obtained execution order is other than both a first order and orders preceding a preset order, continue execution of the script, using the second execution portion, upon determining that the obtained execution order is the first order or the order preceding the preset order, discontinue execution of the script, and finish display of the web page by closing the web page displayed thus far in accordance with the user operation.

2. An operation processing device used to operate an information device, the operation processing device comprising:

an operation input portion that receives a user operation;

a storage that stores a web browser comprising a script engine;

a display portion that displays, in a window of a browser, a web page including a script used to cause the information device to perform processing; and a hardware processor configured to execute, using a first execution portion of the script engine, the script in a state where the web page is displayed, wherein, in response to the user operation of closing the window of the web page or the user operation of causing transition to a different web page during execution of the script, the hardware processor is further configured to:

determine whether the script is used by the operation processing device to cause the information device to perform a single process, upon determining that the script is not used to cause the information device to perform the single process, continue the execution of the script using a second execution portion, upon determining that the script is used to cause the information device to perform the single process, discontinue the execution of the script, and finish display of the web page by closing the web page displayed thus far in accordance with the user operation.

3. The operation processing device according to claim 1, wherein when the hardware processor continues execution of the script, the display portion displays a window for informing a user that the script is continuously executed, and when the hardware processor finishes continued execution of the script, the display portion finishes display of the window for informing the user.

4. A method for controlling an information device, comprising:

obtaining, by a web browser of an information processing device on a network to which the information device is connected, a web page including a script used to cause the information device to perform a designated process from a server on the network;

displaying, by the web browser, the web page on a display device; and executing, by the web browser, using a first execution portion of a script engine, the script in response to operation associated with the script while the web page is displayed, wherein in response to a user operation of closing a window of the web page or a user operation of causing transition to a different web page in the window during execution of the script, the information processing device determines whether the script is used to cause the information device to perform a plurality of processes in order, upon determining that the script is used to cause the information device to perform the plurality of processes in order, obtain an execution order of the process currently being executed, using a second execution portion of the script engine, wherein the execution order is determined while the first execution portion executes the script, upon determining that the script is not used to cause the information device to perform the plurality of processes in order, or upon determining that the obtained execution order is other than both a first order and orders preceding a preset order, the web browser continues execution of the script using the second execution portion, upon determining that the obtained execution order is the first order or the order preceding the preset order, the web browser discontinues execution of the script, and finishes displaying the web page by closing the web page displayed thus far in accordance with the operation.

5. A method for controlling an information device, comprising:

obtaining, by a web browser of an information processing device on a network to which the information device is connected, a web page including a script used to cause the information device to perform a designated process from a server on the network;

displaying, by the web browser, the web page on a display device; and executing, by the web browser, using a first execution portion of a script engine, the script in response to operation associated with the script while the web page is displayed, wherein in response to a user operation of closing a window of the web page or a user operation of causing transition to a different web page in the window during execution of the script, the information processing device determines whether the script is used by the operation processing device to cause the information device to perform a single process, upon determining that the script is not used to cause the information device to perform the single process, the web browser continues the execution of the script using a second execution portion, upon determining that the script is used to cause the information device to perform the single process, the web browser discontinues the execution of the script, and finishes displaying the web page by closing the web page displayed thus far in accordance with the user operation.

6. The method according to claim 4, wherein
when the web browser continues execution of the script, the web browser displays a window for informing a user of continued execution of the on a display device, and
when the web browser finishes continued execution of the script, the web browser finishes display of the window for informing the user.

7. A non-transitory computer-readable storage medium storing thereon a computer program executed in a device used to operate an information device, the computer program causing a computer of the device to perform processes comprising
a first display process of displaying, in a window of a browser, a web page including a script used to cause the information device to perform processing a script execution process of executing, using a first execution portion of a script engine, the script in a state where the web page is displayed,
wherein in response to a user operation of closing the window of the web page or a user operation of causing transition to a different web page in the window during execution of the script, the computer program further causes the computer of the device to perform processes comprising:
a determining process of determining whether the script is used by the computer to cause the information device to perform a plurality of processes in order,
upon determining that the script is used to cause the information device to perform the plurality of processes in order, an obtaining process of obtaining an execution order of the process currently being executed, using a second execution portion of the script engine, wherein the execution order is determined while the first execution portion executes the script,
upon determining that the script is not used to cause the information device to perform the plurality of processes in order, or upon determining that the obtained execution order is other than both a first order and orders preceding a preset order, a script continued execution process of continuing to execute on the computer using the second execution portion,
upon determining that the obtained execution order is the first order or the order preceding the preset order, the script continued execution process of discontinuing to execute, and
a second display process of finishing display of the web page by closing the web page displayed thus far in accordance with the user operation.

8. A non-transitory computer-readable storage medium storing thereon a computer program executed in a device used to operate an information device, the computer program causing a computer of the device to perform processes comprising
a first display process of displaying, in a window of a browser, a web page including a script used to cause the information device to perform processing a script execution process of executing, using a first execution portion of a script engine, the script in a state where the web page is displayed,
wherein in response to a user operation of closing the window of the web page or a user operation of causing transition to a different web page in the window during execution of the script, the computer program further causes the computer of the device to perform processes comprising:
a determining process of determining whether the script is used by the computer to cause the information device to perform a single process,
upon determining that the script is not used to cause the information device to perform the single process, a script continued execution process of continuing to execute using a second execution portion by the computer,
upon determining that the script is used to cause the information device to perform the single process, the script continued execution process of discontinuing execution of the script, and
a second display process of finishing display of the web page by closing the web page displayed thus far in accordance with the user operation.

9. The non-transitory computer-readable storage medium according to claim 7, wherein
when he script is continued to executed, the computer is caused to display a window for informing a user that the script is continued to execute on a display device, and
when continued execution of the script is finished, the computer is caused to finish display of the window for informing the user.

10. The operation processing device according to claim 1, wherein the display portion stops the display of the web page when the operation of closing the window of the web page is performed.

11. The operation processing device according to claim 1, wherein the display portion stops the display of the web page when the operation of causing transition to a different web page in the window is performed.

12. The method according to claim 4, further comprising stopping the display of the web page when the operation of closing the window of the web page is performed.

13. The method according to claim 4, further comprising stopping the display of the web page when the operation of causing transition to a different web page in the window is performed.

14. The non-transitory computer-readable storage medium according to claim 7, wherein the computer program causes the computer of the device to perform further processes comprising:
stopping the display of the web page when the operation of closing the window of the web page is performed.

15. The non-transitory computer-readable storage medium according to claim 7, wherein the computer program causes the computer of the device to perform further processes comprising:
stopping the display of the web page when the operation of causing transition to a different web page in the window is performed.

* * * * *